(12) United States Patent
Toyoda

(10) Patent No.: US 9,382,443 B2
(45) Date of Patent: Jul. 5, 2016

(54) METAL POWDER, ULTRAVIOLET-CURABLE INKJET COMPOSITION AND RECORDING MATERIAL

(71) Applicant: SEIKO EPSON CORPORATION, Tokyo (JP)

(72) Inventor: Naoyuki Toyoda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/510,409

(22) Filed: Oct. 9, 2014

(65) Prior Publication Data

US 2015/0125673 A1    May 7, 2015

(30) Foreign Application Priority Data

Nov. 6, 2013 (JP) .................. 2013-230641

(51) Int. Cl.
| | |
|---|---|
| *C09D 133/14* | (2006.01) |
| *C09D 11/38* | (2014.01) |
| *C09D 11/101* | (2014.01) |
| *C09D 11/322* | (2014.01) |
| *B22F 1/00* | (2006.01) |

(52) U.S. Cl.
CPC ............ *C09D 133/14* (2013.01); *B22F 1/0018* (2013.01); *B22F 1/0059* (2013.01); *B22F 1/0062* (2013.01); *C09D 11/101* (2013.01); *C09D 11/322* (2013.01); *C09D 11/38* (2013.01); *B22F 2001/0033* (2013.01); *Y10T 428/24909* (2015.01)

(58) Field of Classification Search
CPC .. C09D 11/101; C09D 11/322; B22F 1/0062; B22F 2999/00; Y10T 428/24909
USPC .......................................................... 428/403
See application file for complete search history.

(56) References Cited

U.S. PATENT DOCUMENTS

| | | | |
|---|---|---|---|
| 6,287,695 B1 * | 9/2001 | Kaupp et al. ................... | 428/403 |
| 6,340,723 B1 * | 1/2002 | Nitta et al. ...................... | 524/430 |
| 8,088,486 B2 * | 1/2012 | Toyoda et al. ................. | 428/403 |
| 8,309,629 B2 * | 11/2012 | Watanabe ....................... | 523/161 |
| 8,771,824 B2 * | 7/2014 | Toyoda et al. ............. | 428/195.1 |
| 2009/0220695 A1 * | 9/2009 | Oyanagi et al. ............... | 427/256 |
| 2009/0280302 A1 | 11/2009 | Fukumoto et al. | |

FOREIGN PATENT DOCUMENTS

JP     2009-057548 A     3/2009

* cited by examiner

*Primary Examiner* — Leszek Kiliman
(74) *Attorney, Agent, or Firm* — Global IP Counselors, LLP

(57) ABSTRACT

An ultraviolet-curable inkjet composition is a composition discharged using an inkjet method, and includes a polymerized compound and a metal powder consisting of a plurality of particles. The metal powder includes, as the particles, items that are surface-processed using an isocyanate compound.

10 Claims, No Drawings

US 9,382,443 B2

METAL POWDER, ULTRAVIOLET-CURABLE INKJET COMPOSITION AND RECORDING MATERIAL

CROSS-REFERENCE TO RELATED APPLICATIONS

This application claims priority to Japanese Patent Application No. 2013-230641 filed on Nov. 6, 2013. The entire disclosure of Japanese Patent Application No. 2013-230641 is hereby incorporated herein by reference.

BACKGROUND

1. Technical Field

The present invention relates to a metal powder, an ultraviolet-curable inkjet composition and a recording material.

2. Related Art

Conventionally, as a production method of a decorative product exhibiting a glossy external appearance, metallic plating, stamp-printing using a metallic foil, thermal transfer by using a metallic foil or the like have been used.

However, with these methods, there were problems such as that it was difficult to form fine patterns, and it was difficult to apply to a curved surface part.

On the other hand, as a recording method to a recording medium by using compositions including pigments or colorants, a recording method using an inkjet method is used. The inkjet method is excellent in terms of formation of fine patterns, and in terms of being able to be suitably applied for recording on curved surface parts. Also, in recent years, a composition (ultraviolet-curable inkjet composition), which becomes hardened by irradiating ultraviolet light, has been used in order to provide an item that is particularly excellent in terms of abrasion resistance, water resistance, solvent resistance or the like with the inkjet method (see, for example, Unexamined Patent Publication No. 2009-57548).

However, with the ultraviolet-curable inkjet composition, when metal powder was used instead of pigments or colorants, there is the problem that it is not possible to sufficiently exhibit characteristics such as glossy appearance and the like that the metal has naturally, and problems were caused such as poor stability (storage stability) of the composition, a decrease in discharge stability due to a rise in viscosity due to gelation and the like.

SUMMARY

Objects of the present invention are to provide an ultraviolet-curable inkjet composition with excellent storage stability and which can be suitably used to form a pattern (printing part) with excellent glossy appearance and excellent abrasion resistance, to provide a metal powder used for production of that ultraviolet-curable inkjet composition, and to provide a recording material having a pattern with excellent glossy appearance and excellent abrasion resistance formed using the ultraviolet-curable inkjet composition.

These objects are achieved by the present invention noted below.

The metal powder of an aspect of the invention includes a plurality of particles, and is a metal powder used for a production of an ultraviolet-curable inkjet composition discharged using an inkjet method, and the particles are surface-processed using an isocyanate compound.

By doing this, it is possible to provide the metal powder for an ultraviolet-curable inkjet composition that can be suitably used for the production of a recording material that is excellent in terms of storage stability, and that is equipped with a pattern (printing part) that is excellent in terms of glossy appearance and abrasion resistance.

With the metal powder of the aspect of the invention, as the particles, it is preferable to include mother particles in which at least a surface is mainly constituted by Al and which have been surface processed using the isocyanate compound.

Among the various metal materials, Al has a particularly excellent glossy appearance naturally, but the present inventors have discovered problems such that when particles constituted using Al were used for the ultraviolet-curable inkjet composition, the storage stability of the ultraviolet-curable inkjet composition became especially low, a decrease in the discharge stability occurred because the viscosity was increased due to gelation, and the like. In contrast to this, with the present invention, even when particles are used for which the surface is constituted using Al, it is possible to reliably prevent the occurrence of the kinds of problems noted above. Specifically, the metal powder of the present invention particularly markedly exhibits the effects of the present invention by being an item for which the mother particles constituted by Al at least for the most part for the surface have been surface processed using an isocyanate compound.

With the metal powder of the aspect of the invention, it is preferable that the particles have a scale-like shape.

By doing this, it is possible to have an item that is particularly excellent in terms of glossy appearance, abrasion resistance and the like of the recording material produced using the ultraviolet-curable inkjet composition.

With the metal powder of the aspect of the invention, it is preferable that an average thickness of the particles be 10 nm or greater and 100 nm or less.

By doing this, it is possible to have an item that is particularly excellent in terms of glossy appearance, abrasion resistance and the like of the recording material produced using the ultraviolet-curable inkjet composition.

With the metal powder of the aspect of the invention, the isocyanate compound preferably has a chemical structure expressed in formula (1) below.

$$RNCO \qquad (1)$$

(In formula (1), R represents $CH_3(CH_2)_m$—, and m represents an integer from 2 to 18.)

By doing this, it is possible to have an item that is particularly excellent in terms of the dispersion stability of the metal powder in the ultraviolet-curable inkjet composition, and storage stability of the ultraviolet-curable inkjet composition. Also, to improve the dispersion stability for various dispersion media, the breadth of selection is broadened for dispersion media of the metal powder in the ultraviolet-curable inkjet composition (e.g. a polymerized compound like that described in detail later). It is also possible to have particularly excellent discharge stability of the ultraviolet-curable inkjet composition using the inkjet method.

With the metal powder of the aspect of the invention, the isocyanate compound preferably has a chemical structure represented by formula (2) below.

$$RfNCO \qquad (2)$$

(In formula (2), Rf represents $CF_3(CF_2)_m$— or $CF_3(CF_2)_m(CH_2)_l$—, where m represents an integer from 2 to 18, and l represents an integer from 1 to 18.)

By doing this, it is possible to have particularly excellent storage stability for the ultraviolet-curable inkjet composition. Also, with the recording material produced using the ultraviolet-curable inkjet composition, it is possible to more suitably arrange the metal powder near the outer surface of the printing part (leafing), and to have particularly excellent glossy appearance of the printing part of the produced recording material. It is also possible to have particularly excellent abrasion resistance for the printing part of the produced recording material.

With the metal powder of the aspect of the invention, in addition to surface-processing using the isocyanate compound, it is also preferable to further implement surface-processing using a fluorine based phosphate ester on the metal powder.

By doing this, since it is possible to realize more delicate surface processing, it is possible to have particularly excellent storage stability for the ultraviolet-curable inkjet composition, and to have particularly excellent weather resistance and abrasion resistance and the like of the recording material produced using the ultraviolet-curable inkjet composition.

With the metal powder of the aspect of the invention, the surface-processing using the isocyanate compound and the surface-processing using the fluorine based phosphate ester are implemented on the same particles of the metal powder.

By doing this, it is possible to have an item that is particularly excellent in terms of storage stability of the ultraviolet-curable inkjet composition, and discharge stability over the long term, and also with the recording material produced using the ultraviolet-curable inkjet composition, it is possible to more suitably arrange the metal powder near the outer surface of the printing part, and to more effectively exhibit characteristics such as the glossy appearance and the like that the metal material constituting the metal powder has naturally.

With the metal powder of the aspect of the invention, the fluorine based phosphate esters preferably has a chemical formula shown in formula (3) below.

$$POR_n(OH)_{3-n} \quad (3)$$

(In formula (3), R represents $CF_3(CF_2)_m-$, $CF_3(CF_2)_m(CH_2)_l-$, $CF_3(CF_2)_m(CH_2O)_l-$, $CF_3(CF_2)_m(CH_2CH_2O)_l-$, $CF_3(CF_2)_mO-$, or $CF_3(CF_2)_m(CH_2)_lO-$, n represents an integer from 1 to 3, m represents an integer from 2 to 18, and l represents an integer from 1 to 18.)

By doing this, a synergistic effect by working together with the isocyanate compound is exhibited, and it is possible to have particularly excellent storage stability for the ultraviolet-curable inkjet composition, and to have particularly excellent glossy appearance and abrasion resistance for the printing part of the recording material produced using the ultraviolet-curable inkjet composition.

With the metal powder of the aspect of the invention, it is preferable that an average particle diameter of the metal powder be 500 nm or greater and 3.0 μm or less, and that the maximum particle diameter be 5 μm or less.

By doing this, it is possible to have even more excellent glossy appearance and high-class appearance of the recording material produced using the ultraviolet-curable inkjet composition. It is also possible to have even more excellent storage stability and discharge stability for the ultraviolet-curable inkjet composition.

An ultraviolet-curable inkjet composition of an aspect of the invention is an ultraviolet-curable inkjet composition discharged using the inkjet method, including a polymerized compound, and a metal powder including a plurality of particles. The metal powder includes the particles that are surface-processed using an isocyanate compound.

By doing this, it is possible to provide the ultraviolet-curable inkjet composition that has excellent storage stability, and that can be suitably used for producing a recording material equipped with a pattern (printing part) having an excellent glossy appearance and abrasion resistance.

The ultraviolet-curable inkjet composition of the aspect of the invention preferably includes a monomer having an alicyclic structure as the polymerized compound.

By doing this, it is possible to have particularly excellent storage stability of the ultraviolet-curable inkjet composition, and possible to have particularly excellent glossy appearance and abrasion resistance for the printing part of the recording material produced using the ultraviolet-curable inkjet composition.

With the ultraviolet-curable inkjet composition of the aspect of the invention, the monomer having the alicyclic structure preferably includes one type or two or more types selected from a group consisting of tris(2-acryloxyethyl)isocyanurate, dicyclopentenyloxyethyl acrylate, adamantyl acrylate, γ-butyrolactone acrylate, N-vinyl caprolactam, N-vinylpyrrolidone, pentamethyl piperidyl acrylate, tetramethyl piperidyl acrylate, 2-methyl-2-adamantyl acrylate, 2-ethyl-2-adamantyl acrylate, mevalonic acid lactone acrylate, dimethylol tricyclodecane diacrylate, dimethylol dicyclopentane diacrylate, dicyclopentenyl acrylate, dicyclopentanyl acrylate, isobornyl acrylate, cyclohexyl acrylate, acryloyl morpholine, tetrahydrofurfuryl acrylate, cyclohexane spiro-2-(1,3-dioxolan-4-yl)methyl acrylate, and (2-methyl-2-ethyl-1,3-dioxolan-4-yl)methyl acrylate.

By doing this, it is possible to have even more excellent glossy appearance and high class appearance of the recording material produced using the ultraviolet-curable inkjet composition. It is also possible to have even more excellent storage stability and discharge stability of the ultraviolet-curable inkjet composition.

With the ultraviolet-curable inkjet composition of the aspect of the invention, it is preferable to include as the polymerized compound other than the monomer having the alicyclic structure one type or two or more types selected from a group consisting of phenoxyethyl acrylate, benzyl acrylate, acrylic acid 2-(2-vinyloxyethoxy)ethyl, dipropylene glycol diacrylate, tripropylene glycol diacrylate, 2-hydroxy 3-phenoxypropyl acrylate, and 4-hydroxybutyl acrylate.

By doing this, while having excellent storage stability and discharge stability for the ultraviolet-curable inkjet composition, it is possible to have an item that is particularly excellent in terms of responsiveness of the ultraviolet-curable inkjet composition after discharging using the inkjet method, to have particularly excellent recording material productivity, and possible to have particularly excellent abrasion resistance or the like for the formed pattern.

The recording material of an aspect of the invention is produced by, after applying the ultraviolet-curable inkjet composition of the aspect of the invention on the recording medium, irradiating ultraviolet light.

By doing this, it is possible to provide the recording material having a pattern (printing part) with excellent glossy appearance and abrasion resistance.

DETAILED DESCRIPTION OF EXEMPLARY EMBODIMENTS

Following, we will give a detailed description of preferred embodiments of the present invention.

Metal Powder

First, we will describe the metal powder (powder for the ultraviolet-curable inkjet composition) of the present invention.

The metal powder of the present invention includes a plurality of particles, is used for the production of the ultraviolet-curable inkjet composition discharged using the inkjet method, and as the particles, included are items surface processed using an isocyanate compound.

From the past, as a manufacturing method of a decorative product which exhibits a glossy external appearance, metallic plating, stamp-printing using a metallic foil, thermal transfer using a metallic foil or the like have been used.

However, with these methods, there was the problem that it was difficult to form fine patterns, or to apply to a curved surface part.

On the other hand, as a recording method to a recording medium by using compositions including pigments or colorants, a recording method using an inkjet method is used. The inkjet method is excellent in terms of formation of fine patterns and in terms of being suitably applied for recording on curved surface parts. Also, in recent years, a composition (ultraviolet-curable inkjet composition) which becomes hardened by irradiating ultraviolet light has been used in order to provide an item that is particularly excellent in terms of abrasion resistance, water resistance, solvent resistance, or the like using the inkjet method.

However, with the ultraviolet-curable inkjet composition, when metal powder was used instead of pigments or colorants, there was a problem that characteristics such as the glossy appearance that the metal has naturally or the like cannot be sufficiently exhibited, and a problem was caused that the composition stability (storage stability) was poor, and a decrease in the discharge stability occurred because the viscosity was increased due to gelation, and the like.

In light of that, the inventors achieved the present invention as a result of intense research with the object of resolving the kinds of problems noted above. Specifically, the metal powder of the present invention includes particles surface processed using an isocyanate compound. By doing this, it is possible to have an item for which the metal powder of the ultraviolet-curable inkjet composition has excellent chemical stability and dispersion stability, and to have an item for which the ultraviolet-curable inkjet composition has excellent storage stability and discharge stability over the long term, and with the recording material produced using the ultraviolet-curable inkjet composition, it is possible to suitably arrange the metal powder near the outer surface of the printing part, and to sufficiently exhibit the characteristics such as glossy appearance that the metal material constituting the metal powder has naturally and the like. Also, by the particles constituting the metal powder being surface processed using an isocyanate compound, even when using a polymerized compound with low surface tension as the constituent material of the ultraviolet-curable inkjet composition, with the recording material produced using the ultraviolet-curable inkjet composition, it is possible to reliably suitably arrange the metal powder near the outer surface of the metal powder (leafing), and possible to sufficiently exhibit characteristics such as glossy appearance and the like that the metal material constituting the metal powder has naturally. Therefore, the range of choices for the polymerized compound is broadened, and it is possible to easily adjust the characteristics of the ultraviolet-curable inkjet composition or the characteristics of the recording material produced using the ultraviolet-curable inkjet composition (e.g. ultraviolet-curable inkjet composition viscosity, storage stability, discharge stability, recording material abrasion resistance and the like) without sacrificing the glossy appearance that the metal material has naturally. In particular, as an item having a partial structure represented by —NHCOO— by having the isocyanate compound (a compound having a partial structure represented by —N=C=O) react with the metal material constituting the metal powder, the surface of the particles (mother particles) is modified, but the hydrogen bonding force works with the partial structure represented by —NH-COO—. Because of this, it is possible to implement fine surface processing on the particle surface, and possible to markedly exhibit the kinds of effects noted above.

Mother Particles

First, we will describe the mother particles (particles that receive surface processing using an isocyanate compound) of the particles constituting the metal powder.

The mother particles of the particles constituting the metal powder can have at least the area including near the surface constituted using a metal material, and for example the entirety can be constituted using a metal material, or can also have a base part constituted using a non-metal material, and a film constituted using a metal material that covers that base part.

Also, as the metal material constituting the mother particles, it is possible to use a metal by itself or various alloys or the like, but the mother particles are preferably constituted with mainly Al at least near the surface. Among various metal materials, Al naturally exhibits particularly excellent glossy appearance, but when trying to apply particles constituted using Al to the ultraviolet-curable inkjet composition, the inventors discovered that there is a marked occurrence of problems such as that the storage stability of the ultraviolet-curable inkjet composition becomes particularly low, and the storage stability decreases due to a rise in viscosity due to gelation. In contrast to this, even when using particles for which the surface is constituted using Al, it is possible to reliably prevent the occurrence of problems such as those noted above. Specifically, the metal powder of the present invention particularly markedly exhibits the effects of the present invention by being an item for which the mother particles constituted mainly with Al at least near the surface are surface processed using an isocyanate compound.

Also, the mother particles can be produced by any method, but when constituted using Al, it is preferable to obtain them by forming a film constituted by Al using the vapor deposition method, and after that, by pulverizing that film. By doing this, with the pattern (printing part) formed using the ultraviolet-curable inkjet composition including the metal powder of the present invention, it is possible to more effectively express the glossy appearance or the like that Al has naturally. It is also possible to inhibit variation of characteristics between particles. Also, by using this method, suitable production is possible even with a relatively thin metal powder.

When the mother particles are produced using this type of method, for example, by performing the formation of film (film formation) constituted by Al on the base material, it is possible to suitably produce the mother particles. As the base material, for example, a plastic film or the like such as polyethylene terephthalate or the like can be used. Also, the base material can also have a parting agent layer on the film forming surface.

Also, it is preferable that the pulverizing is performed in a liquid by applying ultrasonic vibration to the film. By doing this, it is possible to easily and reliably obtain mother particles with the kind of particle diameter described above, and possible to suppress the occurrence of variations in size, shape, and characteristics between the particles.

Also, when performing pulverization with the above described method, as the liquid, it is possible to suitably use alcohols such as methanol, ethanol, propanol, butanol or the like, carbon hydride compounds such as n-heptane, n-octane, decane, dodecane, tetra-decane, toluene, xylene, cymene, durene, indene, dipentene, tetrahydronaphthalene, decahydronaphthalene, cyclohexylebenzene or the like, also, ether compounds such as ethylene glycol dimethyl ether, ethylene glycol diethyl ether, ethylene glycol methylethyl ether, diethylene glycol dimethyl ether, diethylene glycol diethyl ether, diethylene glycol methylethyl ether, diethylene glycol monobutyl ether acetate, diethylene glycol n-butyl ether, tripropylene glycol dimethyl ether, triethylene glycol ethyl ether, 1,2-dimethoxyethane, bis(2-methoxyethyl) ether, p-dioxane or the like, and also polar compounds such as propylene carbonate, γ-butyrolactone, N-methyl-2-pyrolidone, N, N-dimethyl formamide (DMF), N,N-dimethyl acetamide (DMA), dimethyl sulfoxide, cyclohexanone, acetonitrile or the like. By using this type of liquid, while preventing unintended oxidation or the like of the mother particles, it is possible to have particularly excellent productivity of the mother particles and the metal powder, and to have particularly low variation of size, shape, and characteristics between the particles.

Isocyanate Compound

As described above, the metal powder of the present invention is surface processed using an isocyanate compound.

As isocyanate compounds, it is possible to use a compound having at least one isocyanate group in the molecule.

As the isocyanate compound, it is possible to use an item having the chemical structure expressed in formula (1) below.

$$RNCO \qquad (1)$$

(In formula (1), R represents $CH_3(CH_2)_m-$, and m represents an integer from 2 to 18.)

By doing this, it is possible to have particularly excellent dispersion stability of the metal powder in the ultraviolet-curable inkjet composition, and storage stability of the ultraviolet-curable inkjet composition. Also, to improve the dispersion stability for various dispersion media, the range of selections is broad for dispersion media of the metal powder in the ultraviolet-curable inkjet composition (e.g. the polymerized compound described in detail later). It is also possible to have particularly excellent discharge stability of the ultraviolet-curable inkjet composition using the inkjet method.

In formula (1), m is preferably an integer from 3 to 14, and more preferably an integer from 4 to 12. By doing this, the kinds of effects described above are exhibited more markedly.

Also, as the isocyanate compound, it is possible to use an item having the chemical structure represented by formula (2) below.

$$RfNCO \qquad (2)$$

(In formula (2), Rf represents $CF_3(CF_2)_m-$ or $CF_3(CF_2)_m(CH_2)_l-$, where m represents an integer from 2 to 18, and l represents an integer from 1 to 18.)

By doing this, it is possible to have particularly excellent storage stability for the ultraviolet-curable inkjet composition. Also, with the recording material produced using the ultraviolet-curable inkjet composition, it is possible to more suitably arrange the metal powder near the outer surface of the printing part (leafing), and to have particularly excellent glossy appearance of the printing part of the produced recording material. It is also possible to have particularly excellent abrasion resistance for the printing part of the produced recording material.

In formula (2), it is preferable that m be an integer from 3 to 14, but an integer from 4 to 12 is more preferable. By doing this, the kinds of effects described above can be more markedly exhibited.

In addition, in formula (2), it is preferable that l be an integer from 1 to 14, but an integer from 1 to 10 is more preferable. By doing this, the kinds of effects described above can be more markedly exhibited.

Also, as the isocyanate compound, it is possible to use together an item having the chemical structure represented by formula (1) noted above with an item having the chemical structure represented by formula (2) noted above. By doing this, the effects of both compounds as described above are both exhibited, and the effects of the compounds have a synergistic effect, so the kinds of characteristics described above are even more excellent.

Also, as noted above, when using different types of isocyanate compounds for the surface processing, it is possible to implement the surface processing using a plurality of isocyanate compounds on the same particles, or possible to have a metal powder including a plurality of types of particles for which different surface processing has been implemented (e.g. an item including first particles that were surface processed with an isocyanate compound having the chemical structure represented by formula (1) noted above, and second particles that were surface processed with an isocyanate compound having the chemical structure represented by formula (2) noted above).

The kind of isocyanate compounds noted above can have processing done directly on the mother particles, but it is preferable to have processing performed using the isocyanate compound on those mother particles after having acid or base processing done on the mother particles. By doing this, it is possible to more reliably perform modifications using chemical bonding by the isocyanate compound on the surface of the mother particles, and possible to more effectively exhibit the effects due to using the kind of isocyanate compounds noted above. As an acid, for example, it is possible to use a proton acid of hydrochloric acid, sulfuric acid, phosphoric acid, nitric acid, acetic acid, carbonic acid, formic acid, benzoic acid, chlorous acid, hypochlorous acid, sulfurous acid, hyposulfurous acid, nitrous acid, hyponitrous acid, phosphorous acid, and hypophosphorous acid or the like. Among these, hydrochloric acid, phosphoric acid, and acetic acid are preferable. On the other hand, as a base, for example, sodium hydrate, potassium hydrate, calcium hydrate or the like can be used. Among these, sodium hydrate and potassium hydrate are preferable.

When implementing various types of surface processing on the same particles, it is possible to perform the surface processing divided into a plurality of steps corresponding to each surface preparation agent, or to perform the surface processing with the same step using a plurality of types of surface preparation agents.

Other Surface Preparation Agents

The metal powder of the present invention is acceptable as long as it is surface processed at least using an isocyanate compound, and can be further surface processed using compounds other than the isocyanate compound (other surface preparation agents).

Examples of other surface preparation agents include alkyl phosphate esters, fluorine based phosphate esters, fluorine based silane compounds and the like.

In particular, in addition to surface processing using an isocyanate compound, when the metal powder has surface processing implemented using a fluorine based phosphate ester, it is possible to realize finer surface processing, and possible to have particularly excellent storage stability for the ultraviolet-curable inkjet composition, and to have particularly excellent weather resistance, abrasion resistance and the like of the recording material produced using the ultraviolet-curable inkjet composition.

The metal powder preferably has surface processing using the isocyanate compound and surface processing using the fluorine based phosphate ester implemented on the same particles. By doing this, it is possible to have an item that is particularly excellent in terms of storage stability of the ultraviolet-curable inkjet composition, and discharge stability over the long term, and also with the recording material produced using the ultraviolet-curable inkjet composition, it is possible to more suitably arrange the metal powder near the outer surface of the printing part, and to more effectively exhibit characteristics such as the glossy appearance and the like that the metal material constituting the metal powder has naturally.

As the fluorine based phosphate ester, a phosphate ester having at least one fluorine atom within a molecule can be used.

Specifically, it is preferable that the fluorine based phosphate ester have the chemical formula shown in formula (3) below.

$$POR_n(OH)_{3-n} \tag{3}$$

(In formula (3), R represents $CF_3(CF_2)_m-$, $CF_3(CF_2)_m(CH_2)_l-$, $CF_3(CF_2)_m(CH_2O)_l-$, $CF_3(CF_2)_m(CH_2CH_2O)_l-$, $CF_3(CF_2)_mO-$, or $CF_3(CF_2)_m(CH_2)_lO-$, n represents an integer from 1 to 3, m represents an integer from 2 to 18, and l represents an integer from 1 to 18.)

By doing this, a synergistic effect by working together with the isocyanate compound is exhibited, and it is possible to have particularly excellent storage stability for the ultraviolet-curable inkjet composition, and to have particularly excellent glossy appearance and abrasion resistance for the printing part of the recording material produced using the ultraviolet-curable inkjet composition.

In formula (3), it is preferable that m be an integer from 3 to 14, but an integer from 4 to 12 is more preferable. By doing this, the kinds of effects described above can be more markedly exhibited.

In addition, in formula (3), it is preferable that l be an integer from 1 to 14, but an integer from 1 to 10 is more preferable. By doing this, the kinds of effects described above can be more markedly exhibited.

As the fluorine based silane compound, a silane compound having at least one fluorine atom within a molecule can be used.

Specifically, it is preferable that the fluorine based silane compound as the surface preparation agent have the chemical formula shown in formula (4) below.

$$R^1SiX^1_aR^2_{(3-a)} \tag{4}$$

(In formula (4), $R^1$ represents a hydrocarbon group in which a part or all of the hydrogen atoms are substituted by fluorine atoms, $X^1$ represents a hydrolysis group, ether group, chloro group or hydroxyl group, $R^2$ represents an alkyl group having a carbon number 1 to 4, and a represents an integer of 1 to 3.)

By doing this, a synergistic effect by working together with the isocyanate compound is exhibited, and it is possible to have particularly excellent storage stability for the ultraviolet-curable inkjet composition, and to have particularly excellent glossy appearance and abrasion resistance for the printing part of the recording material produced using the ultraviolet-curable inkjet composition.

As $R^1$ in formula (4), examples include an alkyl group, alkenyl group, aryl group, or aralkyl group for which a part or all of the hydrogen atoms are substituted by fluorine atoms, and furthermore, at least a part of the hydrogen atoms (hydrogen atoms which are not substituted by fluorine atoms) included in the molecular configuration can be substituted by an amino group, carboxyl group, hydroxyl group, thiol group or the like, and hetero atoms or an aromatic ring of benzene or the like such as —O—, —S—, —NH—, —N= or the like can be sandwiched in a carbon chain. Concrete examples of $R^1$ include a phenyl group, benzyl group, phenethyl group, hydroxyphenyl group, chlorophenyl group, aminophenyl group, naphthyl group, anthranil group, pyrenyl group, thienyl group, pyrrolyl group, cyclohexyl group, cyclohexenyl group, cyclopentyl group, cyclopentenyl group, pyridinyl group, methyl group, ethyl group, n-propyl group, isopropyl group, n-butyl group, isobutyl group, sec-butyl group, tert-butyl group, octadecyl group, n-octyl group, chloromethyl group, methoxyethyl group, hydroxyethyl group, aminoethyl group, cyano group, mercaptopropyl group, vinyl group, allyl group, acryloxyethyl group, methacryloxyethyl group, glycidoxypropyl group, or acetoxy group for which a part or all of hydrogen atoms are substituted by fluorine atoms.

Concrete examples of the fluorine based silane compound shown in formula (4) are compounds having a constitution for which a part or all of the hydrogen atoms in a silane compound are substituted by fluorine atoms, the silane compounds including dimethyl dimethoxy silane, diethyl diethoxy silane, 1-propenyl methyl dichlorosilane, propyl dimethyl chlorosilane, propylmethyl dichlorosilane, propyl trichlorosilane, propyl triethoxysilane, propyl trimethoxysilane, styrylethyl trimethoxysilane, tetradecyl trichlorosilane, 3-thiocyanate propyl triethoxysilane, p-tolyl dimethylchlorosilane, p-tolyl methyl dichlorosilane, p-tolyl trichlorosilane, p-tolyl trimethoxysilane, p-tolyl triethoxysilane, di-n-propyl di-n-propoxysilane, diisopropyl di-iso-propoxysilane, di-n-butyl di-n-butyloxysilane, di-sec-butyl di-sec-butyloxysilane, di-t-butyl di-t-butyloxysilane, octadecyltrichlorosilane, octadecyl methyl diethoxy silane, octadecyl triethoxysilane, octadecyl trimethoxysilane, octadecyl dimethylchlorosilane, octadecyl methyl dichlorosilane, octadecyl methoxy dichlorosilane, 7-octenyl dimethylchlorosilane, 7-octenyl trichlorosilane, 7-octenyl trimethoxysilane, octyl methyl dichlorosilane, octyl dimethyl chlorosilane, octyl trichlorosilane, 10-undecenyl dimethylchlorosilane, undecyl trichlorosilane, vinyl dimethyl chlorosilane, methyl dodecyl dimethoxysilane, methyl dodecyl diethoxysilane, methyl octadecyl dimethoxysilane, methyl octadecyl diethoxy silane, n-octyl methyl dimethoxy silane, n-octyl methyl diethoxy silane, triancotil dimethylchlorosilane, triancotil trichlorosilane, methyl trimethoxysilane, methyl triethoxysilane, methyltri-n-propoxysilane, methyl tri-iso-propoxysilane, methyl-tri-n-butyloxysilane, methyltri-sec-butyloxysilane, methyltri-t-butyloxysilane, ethyl trimethoxysilane, ethyl triethoxysilane, ethyl tri-n-propoxysilane, ethyl tri-isopropoxysilane, ethyl-n-butyloxysilane, ethyl tri-sec-butyloxysilane, ethyl tri-t-butyloxysilane, n-propyl trimethoxysilane, isobutyl trimethoxysilane, n-hexyl trimethoxy silane, hexadecyl trimethoxysilane, n-octyl trimethoxysilane, n-dodecyl triethoxy silane, n-octadecyl trimethoxysilane, n-propyl triethoxysilane, isobutyl triethoxysilane, n-hexyl triethoxysilane, hexadecyl triethoxysilane, n-octyl triethoxysilane, n-dodecyl trimethoxysilane, n-octadecyl triethoxysilane, 2-[2-(trichlorosilyl)ethyl]pyridine, 4-[2-(trichlorosilyl)ethyl]pyridine, diphenyl dimethoxysilane, diphenyl diethoxysilane, 1,3-(trichlorosilyl methyl) heptacosane, dibenzyl dimethoxysilane, dibenzyl diethoxy silane, phenyl trimethoxysilane, phenyl trimethyl dimethoxy silane, phenyl dimethyl methoxysilane, phenyl dimethoxysilane, phenyl diethoxysilane, phenyl methyl diethoxysilane, phenyl dimethyl ethoxysilane, benzyl triethoxysilane, benzyl trimethoxysilane, benzyl methyl dimethoxy silane, benzyl dimethyl methoxysilane, benzyl dimethoxysilane, benzyl diethoxysilane, benzyl methyl diethoxysilane, benzyl dimethyl ethoxylsilane, benzyl triethoxysilane, dibenzyl dimethoxysilane, dibenzyl diethoxysilane, 3-acetoxypropyl trimethoxysilane, 3-acryloxypropyl trimethoxysilane, allyl trimethoxysilane, allyl triethoxysilane, 4-aminobutyl triethoxysilane, (amino ethyl amino methyl)phenethyl trimethoxysilane, N-(2-aminoethyl)-3-aminopropylmethyl dimethoxysilane, N-(2-aminoethyl)-3-aminopropyl trimethoxysilane, 6-(aminohexyl aminopropyl)trimethoxysilane, p-aminophenyl trimethoxysilane, p-aminophenyl ethoxysilane, m-aminophenyl trimethoxysilane, m-aminophenyl ethoxysilane, 3-aminopropyl trimethoxysilane, 3-aminopropyl triethoxysilane, ω-aminoundecyl trimethoxysilane, amyl triethoxysilane, benzoxazocinepine dimethyl ester, 5-(bicyclo heptenyl)triethoxysilane, bis(2-hydroxyethyl)-3-aminopropyl triethoxysilane, 8-bromooctyl trimethoxysilane, bromophenyl trimethoxysilane, 3-bromopropyl trimethoxysilane, n-butyl trimethoxysilane, 2-chloromethyl triethoxysilane, chloromethyl methyl diethoxysilane, chloromethyl methyl diisopropoxysilane, p-(chloromethyl)phenyl trimethoxysilane, chloromethyl triethoxysilane, chlorophenyl triethoxysilane, 3-chloropropyl methyl dimethoxysilane, 3-chloropropyl triethoxysilane, 3-chloropropyl trimethoxysilane, 2-(4-chlorosulfonyl phenyl)ethyl trimethoxysilane, 2-cyanoethyl triethoxysilane, 2-cyanoethyl trimethoxysilane, cyanomethyl phenethyl triethoxysilane, 3-cyanopropyl triethoxysilane, 2-(3-cyclohexenyl)ethyl trimethoxysilane, 2-(3-cyclohexenyl)ethyl triethoxysilane, 3-cyclohexenyl trichlorosilane, 2-(3-cyclohexenyl)ethyl trichlorosilane, 2-(3-cyclohexenyl)ethyl dimethyl chlorosilane, 2-(3-cyclohexenyl)ethyl methyl dichlorosilane, cyclohexyl dimethylchlorosilane, cyclohexyl ethyl dimethoxysilane, cyclohexyl methyl dichlorosilane, cyclohexyl methyl dimethoxysilane, (cyclohexyl methyl) trichlorosilane, cyclohexyl trichlorosilane, cyclohexyl trimethoxysilane, cyclooctyl trichlorosilane, (4-cyclooctenyl) trichlorosilane, cyclopentyl trichlorosilane, cyclopentyl trimethoxysilane, 1,1-diethoxy-1-Silacyclopenta-3-ene, 3-(2,4-dinitrophenyl amino)propyl triethoxysilane, (dimethyl chlorosilyl)methyl-7,7-dimethyl amino lupinane, (cyclohexyl aminomethyl)methyl diethoxysilane, (3-cyclopenta dienylpropyl)triethoxysilane, N,N-diethyl-3-aminopropyl) trimethoxysilane, 2-(3,4-epoxycyclohexyl)ethyltrimethoxysilane, 2-(3,4-epoxycyclohexyl)ethyl triethoxysilane, (furfuryl oxymethyl)triethoxysilane, 2-hydroxy-4-(3-tri-ethoxy propoxy)diphenyl ketone, 3-(p-methoxyphenyl)propyl methyl dichlorosilane, 3-(p-methoxyphenyl)propyl trichlorosilane, p-(methylphenethyl)methyl dichlorosilane, p-(methylphenethyl)trichlorosilane, p-(methylphenethyl)dimethylchlorosilane, 3-morpholinopropyl trimethoxysilane, (3-glycidoxypropyl)methyldiethoxysilane, 3-glycidoxypropyl trimethoxysilane, 1,2,3,4,7,7-hexachloro-6-methyldiethoxysilyl-2-norbornene, 1,2,3,4,7,7-hexachloro-6-triethoxysilyl-2-norbornene, 3-iodine propyl trimethoxysilane, 3-isocyanate propyl triethoxysilane, (mercaptomethyl)methyldiethoxysilane, 3-mercaptopropyl methyldimethoxy silane, 3-mercaptopropyl dimethoxysilane, 3-mercaptopropyl triethoxysilane, 3-methacryloxypropyl methyldiethoxysilane, 3-methacryloxypropyl trimethoxysilane, methyl-{2-(3-trimethoxysilyl propylamino)ethylamino}-3-propionate, 7-octenyl trimethoxysilane, R—N-α-phenethyl-N'-triethoxysilyl propyl urea, S—N-α-phenethyl-N'-triethoxysilyl propyl urea, phenethyl trimethoxysilane, phenethyl methyl dimethoxysilane, phenethyl dimethylsilane, phenethyl dimethoxysilane, phenethyl diethoxysilane, phenethyl methyl diethoxy silane, phenethyl dimethylethoxysilane, phenethyl triethoxysilane, (3-phenylpropyl)dimethylchlorosilane, (3-phenylpropyl)methyldichlorosilane, N-phenyl aminopropyl trimethoxysilane, N-(triethoxysilylpropyl)dansylamide, N-(3-triethoxysilylpropyl)-4,5-dihydroimidazole, 2-(triethoxysilylethyl)-5-(chloroacetoxy)bicycloheptane, (S)—N-triethoxysilylpropyl-O-menthocarbamate, 3-(triethoxysilylpropyl)-p-nitro-benzamide, 3-(triethoxysilyl)propyl succinate anhydride, N-[5-(trimethoxysilyl)-2-aza-1-oxo-pentyl]caprolactam, 2-(trimethoxysilylethyl)pyridine, N-(trimethoxysilylethyl)benzyl-N,N,N-trimethyl ammonium chloride, phenyl vinyl diethoxysilane, 3-thiocyanate propyltriethoxysilane, N-{3 acid (triethoxysilyl) propyl}phthalamic acid, 1-trimethoxysilyl-2-(chloromethyl) phenyl ethane, 2-(trimethoxysilyl)ethyl phenyl sulfonyl azide, β-trimethoxy silylethyl-2-pyridine, trimethoxysilylpropyl diethylene triamine, N-(3-trimethoxysilylpropyl)pyrrole, N-trimethoxysilylpropyl-N,N,N-tri-butyl ammonium bromide, N-trimethoxysilylpropyl-N,N,N-tributyl ammonium chloride, N-trimethoxysilylpropyl-N,N,N-trimethylammonium chloride, vinyl methyl diethoxysilane, vinyl triethoxysilane, vinyl trimethoxysilane, vinyl methyl dimethoxysilane, vinyl dimethyl methoxysilane, vinyl dimethyl ethoxysilane, vinyl methyl dichlorosilane, vinyl phenyl dichlorosilane, vinyl phenyl diethoxysilane, vinyl phenyl dimethylsilane, vinyl phenyl methyl chlorosilane, vinyl triphenoxysilane, vinyl tris-t-butoxysilane, adamantyl ethyl trichlorosilane, allyl phenyl trichlorosilane, (aminoethyl aminomethyl) phenethyl trimethoxysilane, 3-aminophenoxy dimethyl vinyl silane, phenyl trichlorosilane, phenyl dimethylchlorosilane, phenyl methyl dichlorosilane, benzyl trichloro silane, benzyl dimethyl chlorosilane, benzyl methyl dichlorosilane, phenethyl diisopropyl chlorosilane, phenethyl trichlorosilane, phenethyl dimethylchlorosilane, phenethyl methyldichlorosilane, 5-(bicyclo heptenyl)trichlorosilane, 5-(bicyclo heptenyl)triethoxy silane, 2-(bicyclo heptyl) dimethylchlorosilane, 2-(bicyclo heptyl)trichlorosilane, 1,4-bis(trimethoxysilylethyl)benzene, bromophenyl trichlorosilane, 3-phenoxypropyl dimethylchlorosilane, 3-phenoxypropyl trichlorosilane, t-butyl phenyl chlorosilane, t-butyl phenyl methoxysilane, t-butyl phenyl dichlorosilane, p-(t-butyl)phenethyl dimethylchlorosilane, p-(t-butyl)phenethyl trichlorosilane, 1,3-(dichloromethyl silylmethyl)heptacosane, ((chloromethyl)phenylethyl)dimethylchlorosilane, ((chloromethyl)phenylethyl)methyl dichlorosilane, ((chloromethyl)phenylethyl)trichlorosilane, ((chloromethyl)phenylethyl)trimethoxysilane, chlorophenyl trichlorosilane, 2-cyanoethyl trichlorosilane, 2-cyanoethyl methyl dichlorosilane, 3-cyanopropyl methyldiethoxysilane, 3-cyanopropyl methyl dichlorosilane, 3-cyanopropyl methyl dichlorosilane, 3-cyanopropyl dimethylethoxysilane, 3-cyanopropyl methyl dichlorosilane, 3-cyanopropyl trichlorosilane, or the like.

It is preferable that the fluorine based silane compound (surface preparation agent) have a perfluoroalkyl structure $(C_nF_{2n+1})$. By doing this, a synergistic effect by working together with the isocyanate compound is exhibited, and it is possible to have even more excellent storage stability for the ultraviolet-curable inkjet composition, and to have even more excellent glossy appearance and abrasion resistance for the printing part of the recording material produced using the ultraviolet-curable inkjet composition.

As a fluorine based silane compound having a perfluoroalkyl structure $(C_nF_{2n+1})$, an example is shown in formula (5) below.

$$C_nF_{2n+1}(CH_2)_mSiX^1_aR^2_{(3-a)} \qquad (5)$$

(In formula (5), $X^1$ represents a hydrolysis group, ether group, chloro group or hydroxyl group, $R^2$ represents an alkyl group having a carbon number from 1 to 4, n represents an integer from 1 to 14, m represents an integer from 2 to 6, and a represents an integer from 1 to 3.)

Concrete examples of the compounds having such a structure include $CF_3$—$CH_2CH_2$—$Si(OCH_3)_3$, $CF_3(CF_2)_3$—$CH_2CH_2$—$Si(OCH_3)_3$, $CF_3(CF_2)_5$—$CH_2CH_2$—$Si(OCH_3)_3$, $CF_3(CF_2)_5$—$CH_2CH_2$—$Si(OC_2H_5)_3$, $CF_3(CF_2)_7$—$CH_2CH_2$—$Si(OCH_3)_3$, $CF_3(CF_2)_{11}$—$CH_2CH_2$—$Si(OC_2H_5)_3$, $CF_3(CF_2)_3$—$CH_2CH_2$—$Si(CH_3)(OCH_3)_2$, $CF_3(CF_2)_7$—$CH_2CH_2$—$Si(CH_3)(OCH_3)_2$, $CF_3(CF_2)_8$—$CH_2CH_2$—$Si(CH_3)(OC_2H_5)_2$, $CF_3(CF_2)_8$—$CH_2CH_2$—$Si(C_2H_5)(OC_2H_5)_2$, or the like.

Also, as a fluorine based silane compound, it is also possible to use a perfluoroalkyl ether structure $(C_nF_{2n+1}O)$ instead of perfluoroalkyl structure $(C_nF_{2n+1})$.

An example of a fluorine based silane compound having a perfluoroalkyl ether structure $(C_nF_{2n+1}O)$ is shown in formula (6) below.

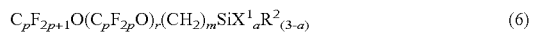

$$C_pF_{2p+1}O(C_pF_{2p}O)_r(CH_2)_mSiX^1{}_aR^2{}_{(3-a)} \qquad (6)$$

(In formula (6), $X^1$ represents a hydrolysis group, ether group, chloro group or hydroxyl group, $R^2$ represents an alkyl group having a carbon number from 1 to 4, p represents an integer from 1 to 4, r represents an integer from 1 to 10, m represents an integer from 2 to 6, and a represents an integer from 1 to 3.)

Concrete examples of the compounds having such a structure include $CF_3O(CF_2O)_6$—$CH_2CH_2$—$Si(OC_2H_5)_3$, $CF_3O(C3F6O)_4$—$CH_2CH_2$—$Si(OCH_3)_3$, $CF_3O(C3F6O)_2(CF_2O)_3$—$CH_2CH_2$—$Si(OCH_3)_3$, $CF_3O(C3F6O)_8$—$CH_2CH_2$—$Si(OCH_3)_3$, $CF_3O(C4F9O)_5$—$CH_2CH_2$—$Si(OCH_3)_3$, $CF_3O(C4F9O)_5$—$CH_2CH_2$—$Si(CH_3)(OC_2H_5)_2$, $CF_3O(C3F6O)_4$—$CH_2CH_2$—$Si(C_2H_5)(OCH_3)_2$, or the like.

Alkyl phosphate esters are items having a structure for which at least a portion of the OH groups that the phosphate has is esterified by a functional group including an alkyl group $(C_nH_{2n+1}$— (where n is an integer of 1 or greater)).

The alkyl phosphate ester preferably has only C, H, P, and O as constituent elements. By doing this, a synergistic effect by working together with the isocyanate compound is exhibited, the dispersibility of the metal powder to the dispersion medium is particularly excellent, and it is possible to keep the dispersed state of the metal powder even without using a dispersant.

In particular, it is preferable that the alkyl phosphate ester have the chemical structure expressed in formula (7) below.

$$POR_n(OH)_{3-n} \qquad (7)$$

(In formula (7), R represents $CH_3(CH_2)_m$—, $CH_3(CH_2)_m(CH_2O)_l$—, $CH_3(CH_2)_m(CH_2CH_2O)_l$— or $CH_3(CH_2)_nO$—, n represents an integer from 1 to 3, m represents an integer from 2 to 19, and l represents an integer from 1 to 20.)

By doing this, a synergistic effect by working together with the isocyanate compound is exhibited, and it is possible to have particularly excellent storage stability for the ultraviolet-curable inkjet composition, and to have particularly excellent glossy appearance and abrasion resistance for the printing part of the recording material produced using the ultraviolet-curable inkjet composition.

In formula (7), m is preferably an integer from 3 to 19, and more preferably an integer from 4 to 17. By doing this, the kinds of effects described above are exhibited more markedly.

In addition, in formula (7), it is preferable that 1 be an integer from 1 to 18, but an integer from 1 to 16 is more preferable. By doing this, the kinds of effects described above can be more markedly exhibited.

Preferred concrete examples of the alkyl phosphate esters include $C_{14}H_{29}(O)P(OCH_2CH_3)_2$, $C_{16}H_{33}(O)P(OCH_2CH_3)_2$, $C_{18}H_{37}(O)P(OH)_2$, $C_{18}H_{37}(O)P(OH)(OCH_2CH_3)$, $C_{12}H_{25}(O)P(OCH_2CH_3)_2$, $C_{12}H_{25}(O)P(OCH_2CH_3)_2$ and the like.

The kind of other surface preparation agents noted above can have processing done directly on the mother particles, but it is preferable to have processing performed using that surface preparation agent on those mother particles after having acid or base processing done on the mother particles. By doing this, it is possible to more reliably perform modifications using chemical bonding by the other surface preparation agent on the surface of the mother particles, and possible to more effectively exhibit the kinds of effects noted above. As the acid or base, for example, it is possible to use the kinds of items described previously.

The particles constituting the metal powder can be any shape, such as a spherical shape, spindle shape, needle-shape, or the like, but it is preferable to be a scale like-shape. By doing this, the metal powder can be arranged so that the particle main surface follows the surface shape of the recording medium on the recording medium to which the ultraviolet-curable inkjet composition is given, so it is possible to more effectively exhibit the glossy appearance or the like that the metal material constituting the metal powder has naturally with the obtained recording material, it is possible to have a particularly excellent glossy appearance and high class appearance of the formed pattern (printing part), and possible to have particularly excellent abrasion resistance for the printing material. Also, with a constitution for which surface processing using the kind of isocyanate compound described above is not implemented, when the particles constituting the metal powder have a scale-like shape, the tendency for the storage stability and discharge stability of the ultraviolet-curable inkjet composition to be low was especially marked, but with the present invention, it is possible to reliably prevent the occurrence of that kind of problem even if the particles constituting the metal powder have a scale-like shape. Specifically, when the shape of the particles constituting the metal powder is a scale-like shape, the effects of the present invention are more markedly exhibited.

With the present invention, the scale-like shape means that, as with flat plate shapes, curved plate shapes and the like, a surface area when observed from a designated angle (as viewed in a planar view) has a bigger shape than a surface area as observed in a direction perpendicular to that observation direction, and specifically, the ratio $(S_1/S_0)$ for the surface area $S_1$ ($\mu m^2$) when the projected area is observed from the direction at which it is maximum (when with a planar view), and the surface area $S_0$ ($\mu m^2$) when the projected area is observed from the direction at which the surface area is a maximum when observing among directions orthogonal to that observed direction is preferably 2 or greater, more preferably 5 or greater, and even more preferably 8 or greater. For example, this value can be obtained by performing the observation for any 10 particles and averaging the calculated values for these particles.

When the particles constituting the metal powder have a scale-like shape, the average thickness of the particles is preferably 10 nm or greater and 100 nm or less, and more preferably 20 nm or greater and 80 nm or less. By doing this, the effects due to the particles having a scale-like shape like those described above are exhibited more markedly.

The average particle diameter of the metal powder is preferably 500 nm or greater and 3.0 μm or less, and more preferably 800 nm or greater and 2.5 μm or less. By doing this, the glossy appearance of the printing part and the high class appearance of the recording material produced using the ultraviolet-curable inkjet composition are even more excellent. It is also possible to have even more excellent storage stability and discharge stability of the ultraviolet-curable inkjet composition. With this specification, "average particle diameter" indicates the average particle diameter of the volume standard (volume average particle diameter ($D_{50}$)). As the measuring device, an example is the laser analysis dispersion type particle size analyzer Microtrac S3000 (made by Nikkiso Co., Ltd.) or the like.

Also, the maximum particle diameter of the metal powder is preferably 5 μm or less, and more preferably 4.5 μm or less. By doing this, it is possible to have even more excellent storage stability and discharge stability for the ultraviolet-curable inkjet composition.

Ultraviolet Curable Inkjet Composition

Next, we will describe the ultraviolet curable inkjet composition of the present invention.

The ultraviolet-curable inkjet composition of the present invention is discharged using an inkjet method, and includes the polymerized compound and the kind of metal powder described above. Because of this, the ultraviolet-curable inkjet composition can have excellent storage stability, and can be suitably used for producing a recording material with a pattern (printing part) with excellent glossy appearance and excellent abrasion resistance.

Metal Powder

The ultraviolet curable inkjet composition of the present invention includes a metal powder such as that described above.

The content rate of the metal powder (which has been surface processed with an isocyanate compound) in the ultraviolet-curable inkjet composition is preferably 0.5 mass % or greater and 10.0 mass % or less, and more preferably 1.0 mass % or greater and 5.0 mass % or less.

Polymerized Compound

The polymerized compound is a component that is polymerized and cured by irradiation using ultraviolet light. By including this kind of component, the recording material produced using the ultraviolet-curable inkjet composition can have excellent abrasion resistance, water resistance, solvent resistance and the like.

The polymerized compound is in liquid form, and with the ultraviolet-curable inkjet composition, it is preferable that it function as a dispersion medium for dispersing the metal powder. By doing this, it is not necessary to use the dispersion medium separately removed (vaporized) in the production process of the recording material, and with the production of the recording material, it is not necessary to provide a step of removing the dispersion medium, so it is possible to have particularly excellent productivity for the recording material. Also, since it is not necessary to use an item for which a typical organic solvent is used as the dispersion medium, an occurrence of the VOC (volatile organic compound) problem can be prevented. Also, by including the polymerized compound, the printing part formed using the ultraviolet-curable inkjet composition can have excellent adhesiveness with various types of recording medium (base material). Specifically, by including the polymerized compound, the ultraviolet-curable inkjet composition has excellent media correspondence.

As the polymerized compound, it is acceptable as long as it is a component that can be polymerized by irradiating ultraviolet light, and for example, various types of monomer, various types of oligomer (including dimer, trimer, or the like), or the like can be used, but it is preferable that the ultraviolet-curable inkjet composition use an item that at least includes a monomer component as the polymerized compound. A monomer is a component that generally has a lower viscosity than an oligomer component or the like, so the ultraviolet-curable inkjet composition has an advantage of having particularly excellent discharge stability.

In particular, the ultraviolet-curable inkjet composition of the present invention preferably includes a monomer having an alicyclic structure as the polymerized compound. In this way, by including a monomer having an alicyclic structure together with the metal powder surface processed with an isocyanate compound such as that described above, it is possible for the ultraviolet-curable inkjet composition to have excellent storage stability, and for the printing part of the recording material produced using the ultraviolet-curable inkjet composition to have excellent glossy appearance and excellent abrasion resistance.

Following are the reasons believed to be why it is possible to obtain these kinds of excellent effects. Specifically, by including a monomer having an alicyclic structure, it is possible to have particularly excellent dispersion stability of the metal powder that was surface processed by the isocyanate compound in the ultraviolet-curable inkjet composition, and possible to suitably prevent over the long term agglutination, sedimentation and the like of the metal powder in the ultraviolet-curable inkjet composition. Also, by this kind of effect being used with a synergistic effect with the effects due to including metal powder surface processed using the isocyanate compound, it is possible to have particularly excellent storage stability for the ultraviolet-curable inkjet composition, and also possible to have particularly excellent glossy appearance and abrasion resistance of the printing part of the recording material produced using the ultraviolet-curable inkjet composition.

Examples of a monomer having an alicyclic structure include tris(2-(meth)acryloyloxyethyl)isocyanurate, dicyclopentenyloxyethyl(meth)acrylate, adamantyl(meth)acrylate, γ-butyrolactone(meth)acrylate, N-vinyl caprolactam, N-vinylpyrrolidone, pentamethylpiperidyl(meth)acrylate, tetramethylpiperidyl(meth)acrylate, 2-methyl-2-adamantyl(meth)acrylate, 2-ethyl-2-adamantyl(meth)acrylate, mevalonic acid lactone(meth)acrylate, dimethylol tricyclodecanedi(meth)acrylate, dimethylol dicyclopentane di(meth)acrylate, dicyclopentenyl(meth)acrylate, dicyclopentanyl(meth)acrylate, isobornyl(meth)acrylate, cyclohexyl(meth)acrylate, (meth)acryloyl morpholine, tetrahydrofurfuryl(meth)acrylate, phenyl glycidyl ether(meth)acrylate, EO-modified hydrogenated bisphenol A di(meth)acrylate, di(meth)acrylated isocyanurate, tri(meth)acrylated isocyanurate, cyclohexane spiro-2-(1,3-dioxolan-4-yl)methyl acrylate, (2-methyl-2-ethyl-1,3-dioxolan-4-yl)methyl acrylate and the like, but it is preferable to be an item including one type or two or more types selected from the group consisting of tris(2-acryloyloxyethyl)isocyanurate, dicyclopentenyloxyethyl ethyl acrylate, adamantyl acrylate, γ-butyrolactone acrylate, N-vinylcaprolactam, N-vinylpyrrolidone, pentamethylpiperidyl acrylate, tetramethylpiperidyl acrylate, 2-methyl-2-adamantyl acrylate, 2-ethyl-2-adamantyl acrylate, mevalonic acid lactone acrylate, dimethylol tricyclodecane diacrylate, dimethylol dicyclopentane diacrylate, dicyclopentenyl acrylate, dicyclopentanyl acrylate, isobornyl acrylate, cyclohexyl acrylate, acryloyl morpholine, tetrahydrofurfuryl acrylate, cyclohexane spiro-2-(1,3-dioxolan-4-yl)methyl acrylate, and (2-methyl-2-ethyl-1,3-dioxolan-4-yl)methyl acrylate. By doing this, it is possible to have even more excellent glossy appearance and high class appearance of the recording material produced using the ultraviolet-curable inkjet composition. It is also possible for the ultraviolet-curable inkjet composition to have even more excellent storage stability and discharge stability.

Among these, when including one type or two or more types selected from the group consisting of acryloylmorpholine, tetrahydrofurfuryl acrylate, γ-butyrolactone acrylate, N-vinyl caprolactam, and N-vinylpyrrolidone, it is possible to have even more excellent dispersion stability of the metal powder in the ultraviolet-curable inkjet composition, possible to more suitably arrange the metal powder near the outer surface of the printing part with the recording material produced using the ultraviolet-curable inkjet composition, and possible to have more excellent glossy appearance of the obtained recording material.

From the perspective of the curing speed of the ultraviolet-curable inkjet composition when irradiating with ultraviolet light, and further improving the productivity of the recording material, it is preferable to be an item including one type or two or more types selected from the group consisting of tris(2-acryloyloxyethyl)isocyanurate, dicyclopentenyloxyethyl ethyl acrylate, γ-butyrolactone acrylate, N-vinylpyrrolidone, dimethylol tricyclodecane diacrylate, dimethylol dicyclopentane diacrylate, dicyclopentenyl acrylate, dicyclopentanyl acrylate, acryloyl morpholine, and tetrahydrofurfuryl acrylate, more preferable to be an item including acryloyl morpholine and/or γ-butyrolactone acrylate, and even more preferable to be an item including γ-butyrolactone acrylate.

Also, when it is an item including one type or two or more types selected from the group consisting of cyclohexyl acrylate, tetrahydrofurfuryl acrylate, and benzyl acrylate, it is possible to have an item even more excellent in terms of flexibility of the printing part formed by curing the ultraviolet-curable inkjet composition.

Also, from the perspective of further improving the abrasion resistance of the printing part formed by curing the ultraviolet-curable inkjet composition, it is preferable to be an item including one type or two or more types selected from the group consisting of tris(2-acryloyloxyethyl)isocyanurate, dicyclopentenyloxyethyl ethyl acrylate, adamantyl acrylate, γ-butyrolactone acrylate, N-vinylcaprolactam, N-vinylpyrrolidone, dimethylol tricyclodecane diacrylate, dimethylol dicyclopentane diacrylate, dicyclopentenyl acrylate, dicyclopentanyl acrylate, isobornyl acrylate, and acryloyl morpholine, and more preferable to be an item including γ-butyrolactone acrylate and/or N-vinylcaprolactam.

Also, in the case of an item including one type or two or more types selected from the group consisting of γ-butyrolactone acrylate, N-vinyl caprolactam, N-vinylpyrrolidone, isobornyl acrylate, and tetrahydrofurfuryl acrylate, the shrinkage ratio during curing of the ultraviolet-curable inkjet composition is smaller, and it is possible to more effectively prevent a decrease in glossy appearance due to the occurrence of unintended creases or the like in the printing part formed by curing the ultraviolet-curable inkjet composition.

The content rate of the monomer having an alicyclic structure in the ultraviolet-curable inkjet composition is preferably 40 mass % or greater and 90 mass % or less, more preferably 50 mass % or greater and 88 mass % or less, and even more preferably 55 mass % or greater and 85 mass % or less. By doing this, there is particularly excellent dispersion stability of the metal powder, and particularly excellent discharge stability is obtained over the long term. In particular, even when the ultraviolet-curable inkjet composition does not include a dispersant, the kinds of excellent effects noted above can be obtained. In contrast to this, when the content rate of the monomer having an alicyclic structure in the ultraviolet-curable inkjet composition is less than the lower limit noted above, the dispersibility of the metal powder surface processed using an isocyanate compound decreases, and it is possible that there will be a decrease in the stability of the droplet discharge using the inkjet method. Also, in this case, it is possible for there to be a decrease in stability over time of the droplet discharge of the ultraviolet-curable inkjet composition. Also, when the content rate of the monomer having an alicyclic structure in the ultraviolet-curable inkjet composition exceeds the upper limit noted above, by there being an excessive increase in the dispersion stability of the metal powder, with the ultraviolet-curable inkjet composition given to the recording medium, the internal existence ratio of the metal powder increases, it becomes difficult to suitably arrange the metal powder near the outer surface of the ultraviolet-curable inkjet composition given to the recording medium, and it is possible that it will be difficult to have sufficiently excellent glossy appearance of the finally obtained recording material (printing part). The ultraviolet-curable inkjet composition can also be an item including two or more compounds as the monomer having an alicyclic structure. In this case, it is preferable that the sum of the content rates of these be a value within the range noted above.

With the monomer having an alicyclic structure, the number of constituent atoms of the cyclic structure formed by covalent bonds is preferably 5 or more, and more preferably 6 or more. By doing this, it is possible to have particularly excellent storage stability for the ultraviolet-curable inkjet composition. With the ultraviolet-curable inkjet composition, as the monomer having an alicyclic structure, it is preferable to be an item including a monofunctional monomer including a heteroatom in the alicyclic structure (monofunctional monomer having a heterocycle not showing aromaticity). By doing this, there is particularly excellent dispersion stability of the metal powder, and particularly excellent discharge stability is obtained over a long time. In particular, even when the ultraviolet-curable inkjet composition does not include a dispersant, the kinds of excellent effects noted above can be obtained. Examples of this kind of monofunctional monomer include tris(2-(meth)acryloyloxyethyl)isocyanurate, γ-butyrolactone(meth)acrylate, N-vinyl caprolactam, N-vinylpyrrolidone, pentamethylpiperidyl(meth)acrylate, tetramethylpiperidyl(meth)acrylate, mevalonic acid lactone(meth)acrylate, (meth)acryloyl morpholine, tetrahydrofurfuryl (meth)acrylate and the like.

The content rate of the monofunctional monomer (monofunctional monomer including a heteroatom in the alicyclic structure) in the ultraviolet-curable inkjet composition is preferably 10 mass % or greater and 80 mass % or less, and more preferably 15 mass % or greater and 75 mass % or less. By doing this, the curing shrinkage is suppressed, there is little scattering, and it is possible to produce the recording material equipped with a pattern (printing part) with more excellent glossy appearance. With the ultraviolet-curable inkjet composition, it is possible to include two or more types of compound as the monofunctional monomer including a heteroatom in the alicyclic structure. In this case, the sum of the content rates of these is preferably a value within the range noted above.

The polymerized compound constituting the ultraviolet-curable inkjet composition can also be an item that includes a monomer that does not have an alicyclic structure.

Examples of this kind of monomer (monomer that does not have an alicyclic structure) include phenoxyethyl(meth)acrylate, benzyl(meth)acrylate, (meth)acrylate 2-(2-vinyloxy ethoxy)ethyl, dipropylene glycol di(meth)acrylate, tripropylene glycol di(meth)acrylate, 2-hydroxy-3-phenoxypropyl (meth)acrylate, and 4-hydroxybutyl(meth)acrylate, lauryl (meth)acrylate, 2-methoxyethyl(meth)acrylate, isooctyl (meth)acrylate, stearyl(meth)acrylate, 2-ethoxyethyl(meth) acrylate, benzyl(meth)acrylate, 1H,1H,5H-octafluoropentyl (meth)acrylate, 2-hydroxyethyl(meth)acrylate, 2-hydroxypropyl(meth)acrylate, isobutyl(meth)acrylate, t-butyl(meth)acrylate, ethyl carbitol(meth)acrylate, 2,2,2-trifluoroethyl(meth)acrylate, 2,2,3,3-tetrafluoropropyl(meth) acrylate, methoxy triethylene glycol(meth)acrylate, PO-modified nonylphenol(meth)acrylate, EO-modified nonylphenol(meth)acrylate, EO-modified 2 ethylhexyl(meth) acrylate, phenoxy diethylene glycol(meth)acrylate, EO-modified phenol(meth)acrylate, EO-modified cresol (meth)acrylate, methoxy polyethylene glycol(meth)acrylate, dipropylene glycol(meth)acrylate, 2-n-butyl-2-ethyl-1,3-propanediol di(meth)acrylate, tetraethylene glycol di(meth) acrylate, 1,9-nonanediol di(meth)acrylate, 1,4-butanediol di(meth)acrylate, bisphenol A EO-modified di(meth)acrylate, 1,6-hexanediol di(meth)acrylate, polyethylene glycol 200 di(meth)acrylate, polyethylene glycol 300 di(meth)acrylate, neopentyl glycol hydroxypivalate di(meth)acrylate, 2-ethyl-2-butyl-propanediol di(meth)acrylate, polyethylene glycol 400 di(meth)acrylate, polyethylene glycol 600 di(meth)acrylate, polypropylene glycol di(meth)acrylate, bisphenol A EO-modified di(meth)acrylate, PO-modified bisphenol A di(meth)acrylate, trimethylolpropane tri(meth)) acrylate, pentaerythritol tri(meth)acrylate, trimethylolpropane EO-modified tri(meth)acrylate, glycerin PO-added tri (meth)acrylate, tris(meth)acryloyloxyethyl phosphate, pentaerythritol tetra(meth)acrylate, PO modified trimethylolpropane tri(meth)acrylate, 2-(meth)acryloyloxyethyl phthalate, 3-(meth)acryloyloxypropyl acrylate, w-carboxy(meth) acryloyloxyethyl phthalate, di-trimethylolpropane tetra (meth)acrylate, dipentaerythritol penta-/hexa-(meth) acrylate, dipentaerythritol hexa(meth)acrylate and the like, but it is preferable to be an item including one type or two or more types selected from the group consisting of phenoxy ethyl acrylate, benzyl acrylate, acrylic acid 2-(2-vinyloxyethoxy)ethyl, dipropylene glycol diacrylate, tripropylene glycol diacrylate, 2-hydroxy 3-phenoxy propyl acrylate, and 4-hydroxy butyl acrylate. In addition to monomers having an alicyclic structure, by including this kind of monomer that does not have an alicyclic structure, while having excellent storage stability and discharge stability for the ultraviolet-curable inkjet composition, there is particularly excellent reactivity of the ultraviolet-curable inkjet composition after discharging using the inkjet method, it is possible to have particularly excellent productivity of the recording material, and it is possible to have particularly excellent abrasion resistance of the formed pattern and the like.

Among these, in the case of an item including phenoxy-ethyl acrylate, with the recording material produced using the ultraviolet-curable inkjet composition, it is possible to suitably arrange the metal powder near the outer surface of the printing part, and possible to have even more excellent glossy appearance of the obtained recording material.

Also, in the case of an item including acrylic acid 2-(2-vinyloxyethoxy)ethyl, it is possible to have even more excellent curing speed of the ultraviolet-curable inkjet composition when irradiating ultraviolet light, and productivity of the recording material.

Also, in the case of an item including phenoxy ethyl acrylate and/or 2-hydroxy 3-phenoxypropyl acrylate, it is possible to have even more excellent flexibility of the printing part formed by curing the ultraviolet-curable inkjet composition.

Also, from the perspective of further improving the abrasion resistance of the printing part formed by curing the ultraviolet-curable inkjet composition, it is preferable to include one type or two or more types selected from the group consisting of 2-(2-vinyloxyethoxy)ethyl acrylate, dipropylene glycol diacrylate, and tripropylene glycol diacrylate, and more preferable to include acrylic acid 2-(2-vinyloxyethoxy) ethyl.

Also, when including phenoxy ethyl acrylate, the shrinkage ratio during curing of the ultraviolet-curable inkjet composition is smaller, and it is possible to more effectively prevent a decrease in the glossy appearance or the like due to unintended creases or the like in the printing part formed by curing the ultraviolet-curable inkjet composition.

The content rate of the monomer other than a monomer having an alicyclic structure in the ultraviolet-curable inkjet composition is preferably 5 mass % or greater and 50 mass % or less, and more preferably 10 mass % or greater and 40 mass % or less. By doing this, it is possible to make adjusting even easier for the curing speed of the ultraviolet-curable inkjet composition, the flexibility, the shrinkage ratio and the like. The ultraviolet-curable inkjet composition can also be an item including two or more types of compounds as the monomer that does not have an alicyclic structure. In this case, it is preferable that the sum of the content rates of these be a value within the range noted above.

Other than a monomer, the ultraviolet-curable inkjet composition can also include as the polymerized compound an oligomer (including dimer, trimer or the like), a prepolymer or the like. As the oligomer or prepolymer, for example it is possible to use the kind of monomers described above as constituent components. It is preferable that the ultraviolet-curable inkjet composition include a multifunctional oligomer. By doing this, while having excellent storage stability of the ultraviolet-curable inkjet composition, it is possible to have particularly excellent abrasion resistance and the like of the formed pattern. As the oligomer, it is preferable to use a urethane oligomer for which the repeated structure is urethane, and to use an epoxy oligomer for which the repeated structure is epoxy or the like.

The content rate of the polymerized compound in the ultraviolet-curable inkjet composition is preferably 70 mass % or greater and 99 mass % or less, and more preferably 80 mass % or greater and 98 mass % or less. By doing this, it is possible to have the ultraviolet-curable inkjet composition be even more excellent in terms of storage stability, discharge stability, and hardenability, and also possible to have more excellent glossy appearance, abrasion resistance and the like for the recording material produced using the ultraviolet-curable inkjet composition. The ultraviolet-curable inkjet composition can also include two types or more of compounds as the polymerized compound. In this case, it is preferable that the sum of the content rates of these compounds be a value within the range noted above.

Substance A

Also, with the ultraviolet-curable inkjet composition, it is preferable to include a substance A having the partial structure shown in formula (8) below.

(8)

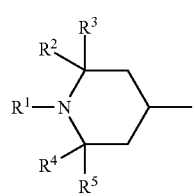

(In formula (8), $R^1$ represents an oxygen atom, a hydrogen atom, a hydrocarbon group, or an alkoxyl group, and $R^2$, $R^3$, $R^4$, and $R^5$ respectively independently represent a hydrogen atom or a hydrocarbon group.)

By the ultraviolet-curable inkjet composition including a substance A having this kind of chemical structure together with the metal powder for which the kind of surface processing noted above is implemented, and by also including a monomer having an alicyclic structure, it is possible to have particularly excellent storage stability and hardenability of the ultraviolet-curable inkjet composition. Also, with the recording material produced using the ultraviolet-curable inkjet composition, the glossy appearance that the metal material constituting the metal powder has naturally and the high class appearance are exhibited more effectively, and it is possible to have particularly excellent glossy appearance and abrasion of the printing part, and particularly excellent durability of the recording material.

In formula (8), $R^1$ is acceptable if it represents an oxygen atom, a hydrogen atom, a hydrocarbon group, or alkoxyl group (this is a chain or alicyclic hydrocarbon group bonded to an oxygen atom), but it is especially preferable to be a hydrogen atom, methyl group, or octyloxy group. By doing this, the ultraviolet-curable inkjet composition can have even more excellent storage stability and excellent discharge stability, and the printing part formed using the ultraviolet-curable inkjet composition can have even more excellent glossy appearance and abrasion resistance.

Also, in formula (8), $R^2$ to $R^5$ are respectively independently acceptable as long as they represent a hydrogen atom or hydrocarbon group, but it is preferable to be an alkyl group of a carbon number 1 to 3, and more preferable to be a methyl group. By doing this, the ultraviolet-curable inkjet composition can have even more excellent storage stability and excellent discharge stability, and the printing part formed using the ultraviolet-curable inkjet composition can have even more excellent glossy appearance and abrasion resistance.

The content rate of the substance A in the ultraviolet-curable inkjet composition is preferably 0.1 mass % or greater and 5.0 mass % or less, and more preferably 0.5 mass % or greater and 3.0 mass % or less. By doing this, the ultraviolet-curable inkjet composition can have even more excellent storage stability, discharge stability, and hardenability, and the recording material produced using the ultraviolet-curable inkjet composition can have even more excellent glossy appearance, and abrasion resistance and the like. The ultraviolet-curable inkjet composition can include more than 2 types of compounds as the substance A. In this case, the sum of the content rates of these compounds is preferably a value within the range noted above.

When the content rate of the substance A is $X_A$ (mass %) and the content rate of the metal powder is $X_M$ (mass %), it is preferable to satisfy a relationship of $0.01 \leq X_A/X_M \leq 0.8$, and a relationship of $0.05 \leq X_A/X_M \leq 0.4$ is more preferable. By satisfying these relationships, the ultraviolet-curable inkjet composition can have even more excellent storage stability and discharge stability, and the printing part formed using the ultraviolet-curable inkjet composition can have even more excellent glossy appearance and abrasion resistance.

Dispersant

The ultraviolet-curable inkjet composition of the present invention can also include a dispersant for the metal powder. By doing this, it is possible to have even more excellent storage stability of the ultraviolet-curable inkjet composition.

In particular, the ultraviolet-curable inkjet composition can include as a dispersant for the metal powder an item that is basic and has a polymeric structure (hereafter also called a "basic polymeric dispersant"). By doing this, it is possible to have even more excellent storage stability for the ultraviolet-curable inkjet composition.

The basic polymeric dispersant can be any item that is basic and has a polymeric structure, and the molecular weight is not specifically limited.

The polymeric structure constituting the basic polymeric dispersant is not particularly limited, and examples include an acrylic polymeric structure (including copolymers), a methacrylic polymeric structure (including copolymers), a polyurethane type polymeric structure, a hydroxyl group-containing carboxylic acid ester structure, a polyether type polymeric structure, a silicone type polymeric structure or the like.

The amine number of the basic polymeric dispersant is not particularly limited, but it is preferably 3 mg KOH/g or greater and 80 mg KOH/g or less, and more preferably 10 mg KOH/g or greater and 70 mg KOH/g or less.

Concrete examples of the basic polymeric dispersants that can be used with the present invention include DISPERBYK-116 (made by BYK Chemie Company), DISPERBYK-182 (made by BYK Chemie Company), DISPERBYK-183 (made by BYK Chemie Company), DISPERBYK-184 (made by BYK Chemie Company), DISPERBYK-2155 (made by BYK Chemie Company), DISPERBYK-2164 (made by BYK Chemie Company), DISPERBYK-108 (made by BYK Chemie Company), DISPERBYK-112 (made by BYK Chemie Company), DISPERBYK-198 (made by BYK Chemie Company), DISPERBYK-2150 (made by BYK Chemie Company), PAA-1112 (made by Nittobo Co., Ltd.) and the like.

When the ultraviolet-curable inkjet composition includes a dispersant, the content rate of the dispersant in the ultraviolet-curable inkjet composition is preferably 5.0 mass % or less, and more preferably, 0.1 mass % or greater and 2.0 mass % or less. By doing this, while having sufficiently excellent glossy appearance of the recording material produced using the ultraviolet-curable inkjet composition, the ultraviolet-curable inkjet composition can have even more excellent storage stability, discharge stability, and hardenability. The ultraviolet-curable inkjet composition can include more than 2 types of compositions as a basic polymeric dispersant. In this case, the sum of the content rates of these compounds is preferably a value within the range noted above. Also, when the content rate of the dispersant in the ultraviolet-curable inkjet composition is too high, by there being an excessive increase in the dispersion stability of the metal powder, with the ultraviolet-curable inkjet composition given to the recording medium, the internal existence ratio of the metal powder increases, it becomes difficult to suitably arrange the metal powder near the outer surface of the given ultraviolet-curable inkjet composition, and it is possible that it will be difficult to have sufficiently excellent glossy appearance of the finally obtained recording material (printing part).

Other Components

The ultraviolet-curable inkjet composition can include components besides the components discussed above (other components). As these components, examples include photopolymerization initiators, slip agents (leveling agents), solvents, polymerization accelerators, polymerization inhibitors, penetration enhancers, wetting agents (humectants), coloring agents, fixing agents, antifungal agents, preservatives, antioxidants, chelating agents, thickeners, sensitizers (sensitizing dyes) and the like.

The photopolymerization initiator is not particularly limited as long as it can generate an active species such as radical, cation, or the like by the irradiation of ultraviolet light and it can start the polymerization reaction of the polymerized compound noted above. As a photopolymerization initiator, a photo-radical polymerization initiator or a photo-cation polymerization initiator can be used, but it is preferable to use the photo-radical polymerization initiator. When the photopolymerization initiator is used, it is preferable that the photopolymerization initiator have an absorption peak in the ultraviolet range.

Examples of the photo-radical polymerization initiator include aromatic ketones, acyl phosphine oxide compounds, aromatic onium salt compounds, organic peroxides, thio compounds (thioxanthone compounds, and thiophenyl group-containing compounds), hexaarylbiimidazole compounds, ketoxime ester compounds, borate compounds, azinium compounds, metallocene compounds, active ester compounds, compounds having a carbon-halogen bond, alkylamine compounds, or the like.

Among these, in view of resolvability in the polymerized compound and hardenability, it is preferable to have at least one type selected from acyl phosphine oxide compound and thioxanthone compound, and it is more preferable to combine acyl phosphine oxide compound and thioxanthone compound.

Concrete examples of the photo-radical polymerization initiator include acetophenone, acetophenone benzyl ketal, 1-hydroxy cyclohexyl phenyl ketone, 2,2-dimethoxy-2-phenylacetophenone, xanthone, fluorenone, benzaldehyde, fluorene, anthraquinone, triphenylamine, carbazole, 3-methylaceto phenone, 4-chlorobenzophenone, 4,4'-dimethoxybenzophenone, 4,4'-diamino benzophenone, Michler's ketone, benzoin propyl ether, benzoin ethyl ether, benzyl dimethyl ketal, 1-(4-isopropyl-phenyl)-2-hydroxy-2-methyl-propane-1-one, 2-hydroxy-2-methyl-1-phenylpropan-1-one, thioxanthone, diethyl thioxanthone, 2-isopropylthioxanthone, 2-chlorothioxanthone, 2-methyl-1-[4-(methylthio) phenyl]-2-morpholino-propan-1-one, bis(2,4,6-trimethyl benzoyl)-phenyl phosphine oxide, 2,4,6-trimethylbenzoyl-diphenyl-phosphine oxide, 2,4-diethyloxan, and bis(2,6-dimethylbenzoyl)-2,4,4-trimethylpentyl phosphine oxide, or the like, and it is possible to select one type or two or more types of compounds from among these and use them in combination.

The content rate of the photopolymerization initiator in the ultraviolet-curable inkjet composition is preferably 0.5 mass % or more and 10 mass % or less. When the content rate of the photopolymerization initiator is in the range noted above, the ultraviolet curing speed is sufficiently high, and in addition, there are almost no remains of melted photopolymerization initiator or coloration caused by the photopolymerization initiator.

When the ultraviolet-curable inkjet composition includes a slip agent, by a leveling action, the surface of the recording material becomes smoother, and the abrasion resistance is improved.

As a slip agent, it is not particularly limited, but for example, it is possible to use silicone surfactants such as polyester modified-silicone, polyether modified-silicone, polyacrylate modified silicone or the like, polymeric surfactants such as polyacrylate, polyester and the like, and it is preferable to use polyether modified-polydimethylsiloxane, polyester modified-polydimethylsiloxane, or polyacrylate modified-dimethylsiloxane.

The ultraviolet-curable inkjet composition of the present invention can include a polymerization inhibitor, but even when it includes a polymerization inhibitor, it is preferable that the content rate of the polymerization inhibitor in the ultraviolet-curable inkjet composition be 0.6 mass % or less, and more preferably 0.2 mass % or less. By doing this, it is possible to have an item that has a relatively high content rate of the polymerized compound in the ultraviolet-curable inkjet composition, so it is possible to have particularly excellent abrasion resistance of the printing part formed using the ultraviolet-curable inkjet composition. Also, with the present invention, even when the content rate of the polymerization inhibitor is relatively low in this way, it is possible to have sufficiently excellent storage stability and discharge stability of the ultraviolet-curable inkjet composition.

Also, it is preferable that the ultraviolet-curable inkjet composition of the present invention not include an organic solvent that is removed (vaporized) in the production process of the recording material. By doing this, an occurrence of the VOC (volatile organic compound) problem can be effectively prevented.

Also, the viscosity at room temperature (20° C.) of the ultraviolet-curable inkjet composition of the present invention measured in compliance with JIS Z8809 using a vibration type viscometer is preferably 20 mPa·s or less, and more preferably 3 mPa·s or greater and 15 mPa·s or less. Because of this, droplet discharge using the inkjet method can be suitably performed.

Recording Material

Next, we will describe the recording material of the present invention.

The recording material of the present invention is produced by giving the kind of ultraviolet-curable inkjet composition described above on the recording medium, after which ultraviolet light is irradiated. This kind of recording material has a pattern (printing part) with excellent glossy appearance and abrasion resistance.

As described above, the ultraviolet-curable inkjet composition includes a polymerized compound, and it has excellent adhesiveness in relation to the recording medium. In this way, since the ultraviolet-curable inkjet composition of the present invention has excellent adhesiveness in relation to the recording medium, the recording medium can be anything, so absorbability or non-absorbability can be used and for example, it is possible to use paper (regular paper, paper for inkjet or the like), plastic material, metal, ceramic, wood material, shells, or natural fiber or synthetic fiber such as cotton, polyester, wool or the like, non-woven fiber or the like.

The recording material of the present invention can be used for any purpose, and for example, it can be used for a decorative product or other purpose. Specific examples of the present invention include interior decorations for vehicles such as a console lid, a switch-base, a center cluster, an interior panel, an emblem, a center console, an indicator panel, or the like, or indicators such as the operating unit (key switches) of various electronic devices, a decorative part exhibiting decorative characteristics, an index, a logo, or the like.

As a droplet discharge method (inkjet method), a piezo method or a method that discharges ink using bubbles generated by heating ink or the like can be used, but from the viewpoint of the difficulty of making property changes in the constituent components of the ultraviolet-curable inkjet composition and the like, the piezo method is preferable.

A publicly known droplet discharge device can be used for performing the discharging of the ultraviolet-curable inkjet composition using the inkjet method.

The ultraviolet-curable inkjet composition discharged using the inkjet method is cured by irradiating ultraviolet light.

As a source of the ultraviolet light, for example, a mercury lamp, a metal halide lamp, an ultraviolet light emitting diode (UV-LED), an ultraviolet laser diode (UV-LD) or the like can be used. Among these, from the viewpoint of compact size, long life, high efficiency, and low cost, the ultraviolet light emitting diode (UV-LED) and the ultraviolet laser diode (UV-LD) are preferable.

Above, we described the present invention based on preferred modes, but the present invention is not limited to these.

Embodiments

Next, we will describe specific embodiments of the present invention.
1 Production of the Inkjet Composition (Ultraviolet-Curable Inkjet Composition)

Embodiment 1

First, a film made of polyethylene terephthalate, which has a smooth surface, (surface roughness Ra 0.02 μm or less) was prepared.

Next, silicone oil was applied all over one surface of this film.

Next, using the vapor deposition method, a film constituted by Al was formed on the surface on which the silicone oil was applied.

Next, a film made of polyethylene terephthalate on which an Al film was formed (base material) was placed in a liquid constituted by diethylene glycol diethylether, and ultrasonic vibration was applied. By doing this, scale-like particles made of Al (particles to become the mother particles) were obtained.

Next, the particles made of Al obtained as noted above were placed in a propanol solution with 1 mass % of $CF_3(CF_2)_7(CH_2)_2NCO$ as the isocyanate compound, and by stirring for 10 seconds, surface processing was performed using the isocyanate compound, and metal powder was obtained.

The average particle diameter of the metal powder obtained in this way was 0.8 μm, the maximum particle diameter was 3.0 μm, and the average thickness was 60 nm.

Next, the inkjet composition (ultraviolet-curable inkjet composition) was obtained by mixing the metal powder with γ-butyrolactone acrylate as the monomer having an alicyclic structure (polymerized compound), phenoxyethyl acrylate as the monomer not having an alicyclic structure (polymerized compound), substance A having the chemical structure represented by formula (9) below, Irgacure 819 (made by Chiba Japan Company) as a photopolymerization initiator, Speedcure TPO (made by ACETO Company) as a photopolymerization initiator, and Speedcure DETX (made by Lambson Company) as a photopolymerization initiator.

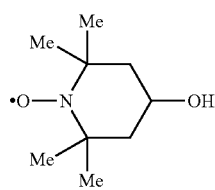

(9)

Embodiments 2 Through 20

The constitution of the metal particles (types of the compounds used for the composition of the mother particles and surface processing) is shown in table 1, and by changing the types and ratios of raw materials used for preparation of the inkjet composition (ultraviolet-curable inkjet composition), these were made to be compositions like those shown in table 1 and table 2, and other than that, the inkjet composition (ultraviolet-curable inkjet composition) was produced in the same way as embodiment 1.

Comparative Example 1

The inkjet composition (ultraviolet-curable inkjet composition) was produced in the same manner as embodiment 1 except for using as a metal powder particles made using Al which did not have surface processing implemented using an isocyanate compound.

Comparative Example 2

The inkjet composition (ultraviolet-curable inkjet composition) was produced in the same manner as comparative example 1 except for using as a metal powder sphere shaped Al powder produced using a gas atomization method (item for which surface processing using an isocyanate compound was not implemented).

Comparative Example 3

The inkjet composition (ultraviolet-curable inkjet composition) was produced in the same manner as embodiment 1 except for obtaining the metal powder by performing surface processing using $CH_3(CH_2)_7O—PO(OH)_2$ which is not an isocyanate compound instead of $CF_3(CF_2)_7(CH_2)_2NCO$ as the isocyanate compound.

Comparative Example 4

The inkjet composition was produced by mixing the scale-like shaped metal powder obtained in the same manner as embodiment 1,1,2-hexanediol, trimethylolpropane, Surfynol 465 (made by Nissin Chemical Industry Co., Ltd.), triethanolamine, glycerin, Polyflow 401 (made by Nissin Chemical Industry Co., Ltd.), and ion-exchanged water. Specifically, the inkjet composition of this comparative example does not include a polymerized compound that is cured by irradiation of ultraviolet light.

Regarding the embodiments and comparative examples noted above, the composition of the inkjet compositions are shown collectively in table 1 and table 2. In the tables, "IS1" represents $CF_3(CF_2)_7(CH_2)_2NCO$, "IS2" represents $CF_3(CF_2)_7NCO$, "IS3" represents $CF_3(CF_2)_5(CH_2)_2NCO$, "IS4" represents $CH_3(CH_2)_7NCO$, "IS5" represents $CH_3(CH_2)_{12}NCO$, "IS6" represents $CH_3(CH_2)_{17}NCO$, "S1" represents $CF_3(CF_2)_5(CH_2)_2O(P)(OH)_2$, "S2" represents $CF_3(CF_2)_5(CH_2)_2O(P)(OH)(OCH_2CH_3)$, "S3" represents $CF_3(CF_2)_5—CH_2CH_2—Si(OC_2H_5)_3$, "S4" represents $CF_3—CH_2CH_2—Si(OCH_3)_3$, "S5" represents $CH_3(CH_2)_7O—PO(OH)_2$, "BLA" represents γ-butyrolactone acrylate as a monomer (polymerized compound) containing an alicyclic structure, "THFA" represents tetrahydrofurfuryl acrylate as a monomer (polymerized compound) containing an alicyclic structure, "VC" represents N-vinyl caprolactam as a monomer (polymerized compound) containing an alicyclic structure, "VP" represents N-vinylpyrrolidone as a monomer (polymerized compound) containing an alicyclic structure, "AMO" represents acryloylmorpholine as a monomer (polymerized compound) containing an alicyclic structure, "TAOEI" represents tris(2-acryloyloxyethyl)isocyanurate as a monomer (polymerized compound) containing an alicyclic structure, "DCPTeOEA" represents dicyclopentenyloxyethyl acrylate as a monomer (polymerized compound) containing an alicyclic structure, "AA" represents adamantyl acrylate as a monomer (polymerized compound) containing an alicyclic structure, "DMTCDDA" represents dimethylol tricyclodecane diacrylate as a monomer (polymerized compound) containing an alicyclic structure, "DMDCPTA" represents dimethylol dicyclopentane diacrylate as a monomer (polymerized compound) containing an alicyclic structure, "DCPTeA" represents dicyclopentenyl acrylate as a monomer (polymerized compound) containing an alicyclic structure, "DCPTaA" represents dicyclopentanyl acrylate as a monomer (polymerized compound) containing an alicyclic structure, "IBA" represents isobornyl acrylate as a monomer (polymerized compound) containing an alicyclic structure, "CHA" represents cyclohexyl acrylate as a monomer (polymerized compound) containing an alicyclic structure, "DAI" represents isocyanurate diacrylate as a monomer (polymerized compound) containing an alicyclic structure, "TAI" represents isocyanurate triacrylate as a monomer (polymerized compound) containing an alicyclic structure, "BLM" represents γ-butyrolactone methacrylate as a monomer (polymerized compound) containing an alicyclic structure, "THFM" represents tetrahydrofurfuryl methacrylate as a monomer (polymerized compound) containing an alicyclic structure, "DCPTeOEM" represents dicyclopentenyloxyethyl methacrylate as a monomer (polymerized compound) containing an alicyclic structure, "AM" represents adamantyl methacrylate as a monomer (polymerized compound) containing an alicyclic structure, "PMPM" represents pentamethyl piperidyl methacrylate as a monomer (polymerized compound) containing an alicyclic structure, "TMPM" represents tetramethylpiperidyl methacrylate as a monomer (polymerized compound) containing an alicyclic structure, "MAM" represents 2-methyl-2-adamantyl methacrylate as a monomer (polymerized compound) containing an alicyclic structure, "EAM" represents 2-ethyl-2-adamantyl methacrylate as a monomer (polymerized compound) containing an alicyclic structure, "MLM" represents mevalonic acid lactone methacrylate as a monomer (polymerized compound) containing an alicyclic structure, "DCPTeM" represents dicyclopentenyl methacrylate as a monomer (polymerized compound) containing an alicyclic structure, "DCPTaM" represents dicyclopentanyl methacrylate as a monomer (polymerized compound) containing an alicyclic structure, "IBM" represents isobornyl methacrylate as a monomer (polymerized compound) containing an alicyclic structure, "CHM" represents cyclohexyl methacrylate as a monomer (polymerized compound) containing an alicyclic structure, "CHDOLA" represents cyclohexane spiro-2-(1,3-dioxolan-4-yl)methyl acrylate as a monomer (polymerized compound) containing an alicyclic structure, "MEDOLA" represents (2-methyl-2-ethyl-1,3-dioxolan-4-yl)methyl acrylate as a monomer (polymerized compound) containing an alicyclic structure, "PEA" represents phenoxyethyl acrylate as a monomer (polymerized compound) not containing an alicyclic structure, "DPGDA" represents dipropylene glycol diacrylate as a monomer (polymerized compound) not containing an alicyclic structure, "TPGDA" represents tripropylene glycol diacrylate as a monomer (polymerized compound) not containing an alicyclic structure, "HPPA" represents 2-hydroxy-3-phenoxypropyl acrylate as a monomer (polymerized compound) not containing an alicyclic structure, "HBA" represents 4-hydroxybutyl acrylate as a monomer (polymerized compound) not containing an alicyclic structure, "ECA" represents ethylcarbitol acrylate as a monomer (polymerized compound) not containing an alicyclic structure, "MTEGA" represents methoxy triethylene glycol acrylate as a monomer (polymerized compound) not containing an alicyclic structure, "TBA" represents t-butyl acrylate as a monomer (polymerized compound) not containing an alicyclic structure, "BA" represents benzyl acrylate as a monomer (polymerized compound) not containing an alicyclic structure, "VEEA" represents 2-(2-hydroxyethoxy)ethyl acrylate as a monomer (polymerized compound) not containing an alicyclic structure, "BM" represents benzyl methacrylate as a monomer (polymerized compound) not containing an alicyclic structure, "UA" represents urethane acrylate as a monomer (polymerized compound) not containing an alicyclic structure, "D2" represents DISPERBYK-182 (made by BKY Chemi Company, amine number: 13 mgKOH/g) as a basic polymeric dispersant, "D5" represents DISPERBYK-2155 (made by BKY Chemi Company, amine number: 48 mgKOH/g) as a basic polymeric dispersant, "A1" represents a compound (substance A) shown in the formula (9) noted above, "A2" represents a compound (substance A) shown in the formula (10) noted above, "A3" represents a compound (substance A) shown in the formula (11) noted below, "A4" represents a compound (substance A) shown in the formula (12) noted below, "ic819" represents Irgacure 819 (made by Chiba Japan Company), "scTPO" represents Speedcure TPO (made by ACETO Company), "scDETX" represents Speedcure DETX (made by Lambson Company), "UV3500" represents UV-3500 (made by BKY Chemi Company), "MEHQ" represents hydroquinone monomethyl ether, "1,2HD" represents 1,2-hexanediol, "IMP" represents trimethylolpropane, "S465" represents Surfynol 465 (made by Nissin Chemical Industry Co., Ltd.), "TEA" represents triethanolamine, "GL" represents glycerin, "LHP" represents LHP-96 (made by Kusumoto Chemicals, Ltd.), "LF" represents LF-1984 (made by Kusumoto Chemicals, Ltd.), and "PF401" represents Polyflow 401 (made by Nissin Chemical Industry Co., Ltd.). Also, in the tables, for embodiment 15, the composition of the constitutional material of the mother particles is shown with the content rate of each element by weight ratio. Also, the viscosity at 20° C. of the inkjet compositions (ultraviolet-curable inkjet compositions) used with each embodiment noted above measured in compliance with JIS Z8809 using a vibration type viscometer were all values within the range of 3 mPa·s or greater and 15 mPa·s or less. Also, for the metal powder constituting the inkjet compositions used with the embodiments noted above, observation was performed on any 10 metal particles of each, the ratio ($S_1/S_0$) was obtained for the surface area $S_1$ ($\mu m^2$) when the projected area is observed from the direction at which it is maximum (when with a planar view) and the surface area $S_0$ ($\mu m^2$) when the projected area is observed from the direction at which the surface area is a maximum when observing among directions orthogonal to that observed direction, and when the average value of these was obtained, the average value for $S_1/S_0$ was always 19 or greater. Also, D2 and D5 are both items which are basic and have a polymeric structure (basic polymeric dispersant).

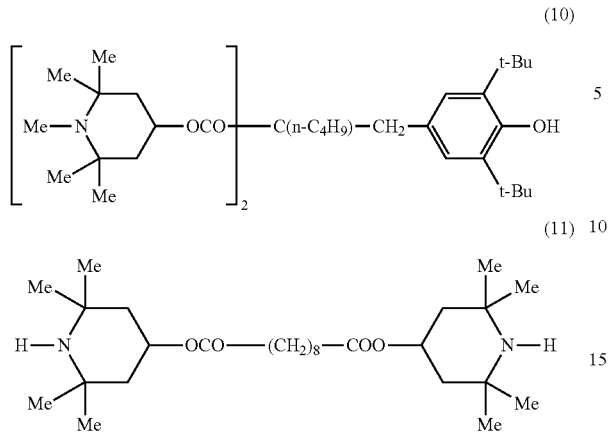

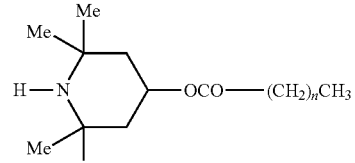

(The substance A shown in formula (12) is a mixture of a plurality of compounds for which n in the formula is 10 or greater and 19 or less (the main component is a compound for which n in the formula is 15 or greater and 18 or less).)

TABLE 1

| | Metal Powder Constitution | | First Ink Constitution Metal Powder | | | | |
|---|---|---|---|---|---|---|---|
| | Constituent Material of Mother Particles | Materials Used for Surface Preparation | Shape | Average Particle Diameter (μm) | Maximum Particle Diameter (μm) | Average Thickness (nm) | Content Rate (Mass Part) | Polymerized Compound |
| Embodiment 1 | A1 | IS1 | Scale-like | 0.8 | 3.0 | 60 | 2.0 | BLA/PEA |
| Embodiment 2 | A1 | IS1 | Scale-like | 0.9 | 0.9 | 20 | 4.0 | BLA/THFA |
| Embodiment 3 | A1 | IS1 | Scale-like | 2.0 | 2.0 | 20 | 2.0 | VC/VP/AMO/VEEA |
| Embodiment 4 | A1 | IS2 | Scale-like | 1.0 | 1.0 | 80 | 2.0 | BLM/THFM/TAOEI/DCPTe0EA/AA/PEA/DPGDA |
| Embodiment 5 | A1 | IS3 | Scale-like | 0.9 | 0.9 | 80 | 2.0 | AM/PMPM/TMPM/MAM/EAM/DCPTeA/PEA/TPGDA/VEEA |
| Embodiment 6 | A1 | IS4 | Scale-like | 0.8 | 0.8 | 60 | 2.0 | DCPTe0EM/MLM/DMTCDDA/DCPTaA/IBA/CHM/PEA/HPPA |
| Embodiment 7 | A1 | IS5 | Scale-like | 0.8 | 0.8 | 60 | 2.0 | DMDCPTA/DCPTeM/DCPTaM/IBM/CHA/PEA/HBA/VEEA |
| Embodiment 8 | A1 | IS6 | Scale-like | 0.9 | 0.9 | 20 | 4.0 | BLA/THFA/PEA/HBA/AMO |
| Embodiment 9 | A1 | IS1 | Scale-like | 2.0 | 2.0 | 20 | 2.0 | BLA/THFA/VC/PEA |
| Embodiment 10 | A1 | IS1 | Scale-like | 1.1 | 1.1. | 20 | 2.0 | BLA/THFA/TBA/VEEA/UA |
| Embodiment 11 | A1 | IS1 | Scale-like | 1.0 | 1.0 | 20 | 2.0 | BLA/THFA/VP/PEA |
| Embodiment 12 | A1 | IS1 + S1 | Scale-like | 0.7 | 0.7 | 40 | 4.0 | BLA/THFA/VEEA/BM/UA |

| | First Ink Constitution | | | | |
|---|---|---|---|---|---|
| | | Dispersant | Substance A | | Other Components |
| | Polymerized Compound Content Rate (Mass Part) | Content Rate (Mass Part) | | Content Rate (Mass Part) | | Content Rate (Mass Part) |
| Embodiment 1 | 60.0/27.8 | — | — | A1 | 0.2 | ic819/scTPO/scDETX | 4.0/4.0/2.0 |
| Embodiment 2 | 41.5/43.3 | — | — | A2 | 0.8 | ic819/scTPO/scDETX/UV3500/MEHQ | 4.0/4.0/2.0/0.2/0.2 |
| Embodiment 3 | 25.8/32.1 17.5/9.6 | D2 | 1.4 | A1 | 1.4 | ic819/scTPO/scDETX/UV3500 | 4.0/4.0/2.0/0.2 |
| Embodiment 4 | 7.4/5.1/31.0/32.0/5.5/4.0/3.9 | — | — | A3 | 0.7 | ic819/scTPO/UV3500/MEHQ | 4.0/4.0/0.2/0.2 |

TABLE 1-continued

| | | | | | | | | |
|---|---|---|---|---|---|---|---|---|
| Embodiment 5 | 3.9/7.9/3.0/ 3.0/3.1/59.1/ 3.2/1.2/2.0 | — | — | A4 | 1.2 | ic819/scTPO/ scDETX/UV3500/MEHQ | 4.0/4.0/ 2.0/0.2/0.2 |
| Embodiment 6 | 3.8/3.6/ 19.6/29.1/ 9/6/9.4/6.5/5.0 | — | — | A1 | 1.0 | ic819/scTPO/ xcDETX/UV3500/MEHQ | 4.0/4.0/ 2.0/0.2/0.2 |
| Embodiment 7 | 45.42/5.5/ 6.6/5.9/17.8 4.1/1.1/1.0 | — | — | A1 | 0.58 | ic819/scTPO/ scDETX | 4.0/4.0/ 2.0 |
| Embodiment 8 | 29.1/34.0/ 9.5/9.0/3.2 | — | — | A2 | 0.8 | ic819/scTPO/ scDETX/UV3500/MEHQ | 4.0/4.0/ 2.0/0.2/0.2 |
| Embodiment 9 | 25.2/32.7/ 7.2/19.9 | D2 | 1.4 | A1 | 1.4 | ic819/scTPO/ scDETX/LF | 4.0/4.0/ 2.0/0.2 |
| Embodiment 10 | 26.6/23.5/ 15.0/9.5/12.6 | — | — | A1 | 0.4 | ic819/scTPO/ scDETX/UV3500/MEHQ | 4.0/4.0/ 2.0/0.2/0.2 |
| Embodiment 11 | 33.5/34.9/ 3.5/16.9 | — | — | A3 | 0.8 | ic819/scTPO/ UV3500/MEHQ | 4.0/4.0/ 0.2/0.2 |
| Embodiment 12 | 24.9/23.9/ 14.1/16.1/10.2 | D5 | 0.2 | A1 | 0.2 | ic819/scTPO/ UV3500/MEHQ | 4.0/2.0/ 0.2/0.2 |

TABLE 2

| | Metal Powder Constitution | | First Ink Constitution — Metal Powder | | | | |
|---|---|---|---|---|---|---|---|
| | Constituent Material of Mother Particles | Materials Used for Surface Preparation | Shape | Average Particle Diameter (μm) | Maximum Particle Diameter (μm) | Average Thickness (nm) | Content Rate (Mass Part) |
| Embodiment 13 | A1 | IS1 + IS2 | Scale-like | 0.9 | 1.5 | 20 | 2.0 |
| Embodiment 14 | A1 | IS2 + IS3 | Scale-like | 1.5 | 1.8 | 15 | 1.0 |
| Embodiment 15 | Ni49, 5Fe50, 5 | IS4 + IS5 | Scale-like | 1.8 | 1.5 | 40 | 2.0 |
| Embodiment 16 | SU316L | IS1 + IS6 | Scale-like | 1.5 | 0.8 | 40 | 2.0 |
| Embodiment 17 | A1 | IS1 + S3 | Scale-like | 0.9 | 0.9 | 20 | 1.5 |
| Embodiment 18 | A1 | IS4 + S4 | Scale-like | 0.9 | 0.9 | 20 | 1.2 |
| Embodiment 19 | A1 | IS1 + S5 | Scale-like | 0.9 | 0.8 | 20 | 1.2 |
| Embodiment 20 | A1 | IS1 | Scale-like | 0.8 | 0.8 | 20 | 2.0 |
| Comparative Example 1 | A1 | — | Scale-like | 0.8 | 3.0 | 60 | 2.0 |
| Comparative Example 2 | A1 | — | Sphere | 0.8 | 10.0 | — | 2.0 |
| Comparative Example 3 | A1 | S5 | Scale-like | 0.8 | 3.0 | 60 | 2.0 |
| Comparative Example 4 | A1 | IS1 | Scale-like | 0.8 | 3.0 | 60 | 3.0 |

| | Polymerized Compound | First Ink Constitution — Dispersant | | Substance A | | Other Components | |
|---|---|---|---|---|---|---|---|
| | | Polymerized Compound Content Rate (Mass Part) | Content Rate (Mass Part) | | Content Rate (Mass Part) | | Content Rate (Mass Part) |
| Embodiment 13 | BLA/THFA PEA | 32.0/34.1 20.3 | — | — | A4 | 1.2 | ic819/scTPO/ scDETX/UV3500/MEHQ | 4.0/4.0/ 2.0/0.2/0.2 |
| Embodiment 14 | DAI/TAI/ ECA/MTEGA/ IBA/BA | 20.8/20.0/ 18.1/17.2/ 6.0/5.5 | — | — | A1 | 1.0 | ic819/scTPO/ scDETX/UV3500/MEHQ | 4.0/4.0/ 2.0/0.2/0.2 |
| Embodiment 15 | BLA/THFA/ TBA/VEEA/UA | 27.0/26.5/ 13.8/15.5/4.0 | — | — | A2 | 0.8 | ic819/scTPO/ scDETX/UV3500MEHQ | 4.0/4.0/ 2.0/0.2/0.2 |
| Embodiment 16 | BLA/THFA/ VEEA/BM/MEDOLA | 26.2/27.6/ 14.1/15.5/4.0 | D5 | 0.2 | A1 | 0.2 | ic819/scTPO/ scDETX/LHP | 4.0/4.0/ 2.0/0.2 |
| Embodiment 17 | AMO/THFA | 52.2/34.8 | — | — | A2 | 0.3 | ic819/scTPO/ scDETX/LHP/LF | 4.0/4.0/ 2.0/0.2/0.2 |

TABLE 2-continued

| | | | | | | | |
|---|---|---|---|---|---|---|---|
| Embodiment 18 | 40.0/40.0/7.0 | — | — | A2 | 0.6 | ic819/scTPO/scDETX/LHP/LP | 4.0/4.0/2.0/0.2/0.2 |
| Embodiment 19 | 21.8/21.8/26.0/17.4 | — | — | A2 | 0.6 | ic819/scTPO/scDETX/LHP/LF | 4.0/4.0/2.0/0.2/0.2 |
| Embodiment 20 | 51.5/34.1 | D2 | 1.0 | A1 | 1.0 | ic819/scTPO/scDETX/UV3500/MEHQ | 4.0/4.0/2.0/0.2/0.2 |
| Comparative Example 1 | 60.0/27.8 | — | — | A1 | 0.2 | ic819/scTPO/scDEX | 4.0/4.0/2.0 |
| Comparative Example 2 | 60.0/27.8 | — | — | A1 | 0.2 | ic819/scTPO/scDEX | 4.0/4.0/2.0 |
| Comparative Example 3 | 60.0/27.8 | — | — | A1 | 0.2 | ic819/scTPO/scDEX | 4.0/4.0/2.0 |
| Comparative Example 4 | — | — | — | — | — | Water/1,2HD/TMP/S465/TEA/GL/PF401 | 69.1/3.0/14.0/1.5/0.3/9.0/0.1 |

2 Droplet Discharge Stability Evaluation (Discharge Stability Evaluation)

The inkjet compositions used for each of the embodiments and comparative examples noted above were evaluated using the kind of test shown hereafter.

First, a droplet discharge device equipped in a chamber (thermal chamber) and the inkjet compositions used with each of the embodiments and comparative examples noted above were prepared, and in a state with the drive waveform of the piezo-element optimized, in an environment of 25° C., 50% RH, for each inkjet composition, the droplets were continuously discharged 2,000,000 times (2,000,000 drops) from each nozzle of the droplet discharge head. After that, operation of the droplet discharge device was stopped, and in a state with each inkjet composition filled in the flow path of the droplet discharge device, this was left for 360 hours in an environment of 25° C., 50% RH.

After that, continuous discharge of the droplets was performed 4,000,000 times (4,000,000 drops) from each nozzle of the droplet discharge head in an environment of 25° C., 50% RH. After being left for 360 hours, in regards to the droplets discharged 4,000,000 times from the nozzles specified near the center of the droplet discharge head, the average value of the skew amount d from the center target position that the respective droplets were mainly targeted to land at was obtained, and an evaluation was performed in accordance with the five level standards below. We can say that the smaller that this value became, the more effective the prevention of a flying curve.

A: The average value of the skew volume d is less than 0.07 μm.

B: The average value of the skew volume d is 0.07 μm or greater and less than 0.14 μm.

C: The average value of the skew volume d is 0.14 μm or greater and less than 0.17 μm.

D: The average value of the skew volume d is 0.17 μm or greater and less than 0.21 μm.

E: The average value of the skew volume d is 0.21 μm or greater.

3 Inkjet Composition Frequency Characteristics

A droplet discharge device equipped in a chamber (thermal chamber) and the inkjet compositions used with each of the embodiments and comparative examples noted above were prepared, and in a state with the drive waveform of the piezo-element optimized, in an environment of 25° C., 50% RH, for each inkjet composition, droplet discharge was performed while changing the piezo-element vibration count (frequency) from all the nozzles of the droplet discharge head. The droplet discharge time for each frequency was 20 minutes. Up to the frequency for which the undischarged nozzle count is less than 1% of the total nozzle count at the point when 20 minutes of discharge ends is used as the maximum frequency that can be actually used, and evaluation of the actually usable frequency range was done according to the four level standards hereafter. The larger this value, the more excellent the frequency characteristics.

A: 15 kHz or greater.

B: 11 kHz or greater and less than 15 kHz.

C: 5 kHz or greater and less than 11 kHz.

D: Less than 5 kHz

4 Evaluation of Ink Storage Stability (Long Term Stability Evaluation)

4.1 Settleability

The inkjet compositions used with the embodiments and comparative examples noted above were respectively placed in a micro tube of height 3 cm, left to stand in an environment of 40° C., and the time was measured until the thickness of the clear layer of supernatant (layer not including metal powder) reached 2 mm, and evaluation was done according to the standards noted hereafter.

A: Time until the clear layer of the supernatant reached 2 mm was two weeks or greater.

B: Time until the clear layer of the supernatant reached 2 mm was one week or greater and less than two weeks C: Time until the clear layer of the supernatant reached 2 mm was three days or greater and less than one week D: Time until the clear layer of the supernatant reached 2 mm was less than three days.

4.2 Occurrence of Foreign Objects (Aggregates) on Filter

After leaving for 60 days in an environment of 40° C., the inkjet compositions used with the embodiments and comparative examples noted above were dipped in 10 mL under reduced pressure using a membrane filter with filtration accuracy 10 μm. After that, the number of ink derived foreign objects (aggregates) existing in the filter were counted, and these were evaluated according to the standards hereafter.

A: Foreign matter (aggregates) in the filter are not found.

B: Foreign matter (aggregates) existing in the filter are 1 or more and 4 or less.

C: Foreign matter (aggregates) existing in the filter are 5 or more and 29 or less.

D: Foreign matter (aggregates) existing in the filter are 30 or more.

4.3 Rise of Viscosity

After the inkjet compositions used with the embodiments and comparative examples noted above were left for 30 days in an environment of 60° C., the viscosity of the inkjet compositions used with each of the embodiments noted above were measured at 20° C. using a vibration type viscometer in compliance with JIS Z8809, rise of viscosity immediately after production was found, and an evaluation was done according to the standards below.

A: The rise of viscosity is less than 10%.
B: The rise of viscosity is 10% or greater and less than 15%.
C: The rise of viscosity is 15% or greater and less than 20%.
D: The rise of viscosity is 20% or greater and less than 25%.
E: The rise of viscosity is 25% or greater, or the occurrence of foreign matter was found.

5 Hardenability

For the inkjet compositions used with each of the embodiments and comparative examples noted above, an Epson inkjet printer PM800C was introduced, and solid printing was performed using DIAFOIL 0440E made by Mitsubishi Plastic Corp. as the recording medium (thickness 38 μm) with an ink volume wet at 9 g/m$^2$, and irradiation of ultraviolet light was done after printing using the RX Firefly LED-UV lamp made by Phoseon Inc. (gap 6 mm, peak wavelength 395 nm, 1000 mW/cm$^2$), confirmation was done of whether the inkjet composition was hardened, and evaluation was done according to the five levels of standards below. To determine whether the inkjet composition was hardened, the surface was rubbed using a cotton swab, and a determination was made of whether or not unhardened ink was adhered. It is possible to calculate whether or not the irradiation volumes A to E below are applicable depending on how many seconds the lamp was irradiated.

A: Hardened using an ultraviolet light irradiation volume of less than 100 mJ/cm$^2$.
B: Hardened using an ultraviolet light irradiation volume of 100 mJ/cm$^2$ or more and less than 200 mJ/cm$^2$.
C: Hardened using an ultraviolet light irradiation volume of 200 mJ/cm$^2$ or more and less than 500 mJ/cm$^2$.
D: Hardened using an ultraviolet light irradiation volume of 500 mJ/cm$^2$ or more and less than 1000 mJ/cm$^2$.
E: Hardened using an ultraviolet light irradiation volume of 1000 mJ/cm$^2$ or more, or did not harden at all.

6 Production of Recording Material

Using the inkjet compositions of each of the embodiments and the comparative examples, an interior panel as a recording material was produced as follows.

First, the inkjet compositions were placed in the inkjet device.

After that, the inkjet compositions were discharged in a designated pattern on a base material (recording medium) having a curved surface part formed using polycarbonate (made by Asahi Glass Co., Ltd., Carbo Glass Polish, 2 mm thick).

After that, after heating for 5 minutes at 60° C., the interior panel as a recording material was obtained by hardening the inkjet compositions on the base material by irradiating ultraviolet light of a spectrum having very high value wavelengths of 365 nm, 380 nm, and 395 nm at irradiation strength 160 mW/cm$^2$ for 10 seconds.

Using the method noted above and using the inkjet compositions of each of the embodiments and comparative examples, 10 interior panels (recording materials) were produced, respectively.

Also, 10 interior panels (recording materials) were respectively produced using the inkjet compositions of each of the embodiments and comparative examples in the same manner as noted above except for, as the base material, using an item formed using polyethylene terephthalate (DIAFOIL G440E, made by Mitsubishi Plastic, Inc., 38 μm thick), an item formed using low-density polyethylene (T.U.S. (L-LDPE) HC-E #80 made by Mitsui Chemicals Tohcell, Inc.), an item formed using biaxially oriented polypropylene (OP U-1 #60 made by Mitsui Chemicals Tohcell, Inc.), and an item formed using hard vinyl chloride (SUNDAY SHEET (transparent) made by Acrysunday Co., Ltd., 0.5 mm thick).

7 Recording Material Evaluation

The following types of evaluations were done for each recording material obtained as noted above.

7.1 Recording Material External Appearance Evaluation

The recording materials produced with each of the embodiments and comparative examples noted above were observed by visual inspection, and evaluation was done in accordance with the seven levels of standards hereafter.

A: Has a glossy appearance overflowing with a high class appearance, has an extremely excellent external appearance.
B: Has a glossy appearance overflowing with a high class appearance, has a very excellent external appearance.
C: Has a glossy appearance with a high class appearance, has an excellent external appearance.
D: Has a glossy appearance with a high class appearance, has a good external appearance.
E: Has an inferior glossy appearance, external appearance is somewhat poor.
F: Has an inferior glossy appearance, external appearance is poor.
G: Has an inferior glossy appearance, external appearance is very poor.

7.2 Degree of Glossiness

Regarding the printing parts of the recording materials produced with each of the embodiments and comparative examples noted above, the degree of glossiness was measured at a flap angle of 60° using a gloss meter (MULTI GLOSS 268 made by Minolta), and evaluation was done in accordance with the standards below.

A: Degree of glossiness 400 or greater.
B: Degree of glossiness 300 or greater and less than 400.
C: Degree of glossiness 200 or greater and less than 300.
D: Degree of glossiness less than 200.

7.3 Abrasion Resistance

Regarding the recording materials produced with each of the embodiments and comparative examples noted above, at the point when 48 hours elapsed from the production of the recording material, an abrasion resistance test was performed using polyethylene terephthalate film as photo paper (Mitsubishi Plastic, Inc., DIAFOIL G440E) using a Sutherland rub tester in accordance with JIS K5701, and using the same method as discussed above 7.2, the degree of glossiness (flap angle 60°) was measured for the recording materials after the abrasion resistance test, the decrease rate of the degree of glossiness after the abrasion resistance test was obtained, and the evaluation was performed according to the standards below.

A: Glossiness decrease rate is less than 5%.
B: Glossiness decrease rate is 5% or greater and less than 13%.
C: Glossiness decrease rate is 13% or greater and less than 23%.
D: Glossiness decrease rate is 23% or greater and less than 27%.
E: Glossiness decrease rate is 27% or greater, or the metal particles are omitted and the surface of the base material is exposed.

These results are shown in table 3. In table 3, M1 represents a recording material produced using a base material made of polycarbonate, M2 represents a recording material produced using a base material made of polyethylene terephthalate, M3 represents a recording material produced using a base material made of low density polyethylene, M4 represents a recording material produced using a base material made of biaxially oriented polypropylene, and M5 represents a recording material produced using a base material made of hard vinyl chloride.

TABLE 3

|  | Discharge Stability | Frequecy Characteristics | Settleability | Long-Term Stability Occurrence of Foreign Matter | Rise of Viscosity | Hardenability |
|---|---|---|---|---|---|---|
| Embodiment 1 | A | A | A | A | A | A |
| Embodiment 2 | A | A | A | A | A | A |
| Embodiment 3 | A | A | A | A | A | A |
| Embodiment 4 | A | A | A | A | A | A |
| Embodiment 5 | A | A | A | A | A | A |
| Embodiment 6 | A | A | A | A | A | A |
| Embodiment 7 | A | A | A | B | B | A |
| Embodiment 8 | A | A | A | B | B | A |
| Embodiment 9 | A | A | B | A | A | A |
| Embodiment 10 | A | A | A | A | A | A |
| Embodiment 11 | A | A | A | A | A | A |
| Embodiment 12 | B | A | B | A | A | A |
| Embodiment 13 | A | A | A | A | A | A |
| Embodiment 14 | B | A | B | A | A | A |
| Embodiment 15 | A | A | A | A | A | A |
| Embodiment 16 | A | A | A | A | A | B |
| Embodiment 17 | A | B | A | B | B | A |
| Embodiment 18 | A | B | A | B | A | A |
| Embodiment 19 | B | B | B | B | B | B |
| Embodiment 20 | A | A | A | A | A | A |
| Comparative Example 1 | E | D | D | D | D | A |
| Comparative Example 2 | D | C | D | D | D | A |
| Comparative Example 3 | D | B | C | C | C | A |
| Comparative Example 4 | C | D | C | C | C | E |

|  | External Appearance Evaluation | | | | | Glossiness | | | | | Abrasion Resistance | | | | |
|---|---|---|---|---|---|---|---|---|---|---|---|---|---|---|---|
|  | M1 | M2 | M3 | M4 | M5 | M1 | M2 | M3 | M4 | M5 | M1 | M2 | M3 | M4 | M5 |
| Embodiment 1 | A | A | A | A | A | A | A | A | A | A | A | A | B | B | A |
| Embodiment 2 | A | A | A | A | A | A | A | A | A | A | A | A | B | B | A |
| Embodiment 3 | A | A | A | A | A | B | B | B | B | B | A | A | B | B | A |
| Embodiment 4 | A | A | A | A | A | A | A | A | A | A | A | A | B | B | A |
| Embodiment 5 | A | A | A | A | A | A | A | A | A | A | A | A | B | B | A |
| Embodiment 6 | A | A | A | A | A | B | B | B | B | B | B | B | B | B | B |
| Embodiment 7 | A | A | A | A | A | B | B | B | B | B | B | B | B | B | B |
| Embodiment 8 | A | A | A | A | A | B | B | B | B | B | A | A | B | B | A |
| Embodiment 9 | B | B | B | B | B | B | B | B | B | B | A | A | B | B | A |
| Embodiment 10 | A | A | A | A | A | A | A | A | A | A | A | A | B | B | A |
| Embodiment 11 | A | A | A | A | A | A | A | A | A | A | A | A | B | B | A |
| Embodiment 12 | A | A | A | A | A | A | A | A | A | A | A | A | B | B | A |
| Embodiment 13 | A | A | A | A | A | A | A | A | A | A | A | A | B | B | A |
| Embodiment 14 | A | A | A | A | A | A | A | A | A | A | A | A | B | B | A |
| Embodiment 15 | C | C | C | C | C | B | B | B | B | B | A | A | B | B | A |
| Embodiment 16 | B | B | B | B | B | B | B | B | B | B | A | A | B | B | A |
| Embodiment 17 | A | A | A | A | A | A | A | A | A | A | A | A | B | B | A |
| Embodiment 18 | A | A | A | A | A | A | A | A | A | A | A | A | B | B | A |
| Embodiment 19 | C | C | C | C | C | B | B | B | B | B | B | B | B | B | B |
| Embodiment 20 | A | A | A | A | A | B | B | B | B | B | A | A | B | B | A |
| Comparative Example 1 | F | F | F | F | F | C | C | C | C | C | C | C | C | C | C |
| Comparative Example 2 | G | G | G | G | G | D | D | D | D | D | C | C | C | C | C |
| Comparative Example 3 | E | E | E | E | E | C | C | C | C | C | C | C | C | C | C |
| Comparative Example 4 | C | C | C | C | C | C | C | C | C | C | E | E | E | E | E |

As is clear from table 3, the ultraviolet-curable inkjet compositions of the present invention have excellent droplet discharge stability, storage stability, and hardenability. Also, the recording materials of the present invention have excellent glossy appearance and external appearance, and the pattern forming parts have excellent abrasion resistance. Also, by using the ultraviolet-curable inkjet composition of the present invention, stable, excellent results were obtained regardless of the type of recording medium. In contrast, satisfactory results were not obtained with the comparative examples.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A metal powder used for a production of an ultraviolet-curable inkjet composition discharged using an inkjet method, the metal powder comprising a plurality of particles, the particles being surface-processed using an isocyanate compound such that surfaces of the particles are modified using chemical bonding by the isocyanate compound.

2. The metal powder according to claim 1, wherein as the particles, mother particles in which at least a surface is mainly constituted by Al and which have been surface-processed using the isocyanate compound are included.

3. The metal powder according to claim 1, wherein the particles have a scale-like shape.

4. The metal powder according to claim 3, wherein an average thickness of the particles is 10 nm or greater and 100 nm or less.

5. The metal powder according to claim 1, wherein the isocyanate compound has a chemical structure expressed in formula (1):

$$RNCO \qquad (1)$$

wherein in the formula (1), R represents $CH_3(CH_2)_m-$, and m represents an integer from 2 to 18.

6. The metal powder according to claim 1, wherein the isocyanate compound has a chemical structure represented by formula (2):

$$RfNCO \qquad (2)$$

wherein in the formula (2), Rf represents $CF_3(CF_2)_m-$ or $CF_3(CF_2)_m(CH_2)_l-$, m represents an integer from 2 to 18, and l represents an integer from 1 to 18.

7. The metal powder according to claim 1, wherein in addition to surface-processing using the isocyanate compound, surface-processing using a fluorine based phosphate compound is further implemented on the metal powder.

8. The metal powder according to claim 7, wherein the surface-processing using the isocyanate compound and the surface-processing using the fluorine based phosphate compound are implemented on the same particles of the metal powder.

9. The metal powder according to claim 7, wherein the fluorine based phosphate compound have a chemical formula represented by formula (3):

$$POR_n(OH)_{3-n} \qquad (3)$$

wherein in the formula (3), R represents $CF_3(CF_2)_m-$, $CF_3(CF_2)_m(CH_2)_l-$, $CF_3(CF_2)_m(CH_2O)_l-$, $CF_3(CF_2)_m(CH_2CH_2O)_l-$, $CF_3(CF_2)_mO-$, or $CF_3(CF_2)_m(CH_2)_lO-$, n represents an integer from 1 to 3, m represents an integer from 2 to 18, and l represents an integer from 1 to 18.

10. The metal powder according to claim 1, wherein an average particle diameter of the metal powder is 500 nm or greater and 3.0 μm or less, and the maximum particle diameter is 5 μm or less.

* * * * *